United States Patent
Hu et al.

(10) Patent No.: US 11,003,677 B2
(45) Date of Patent: May 11, 2021

(54) SYSTEMS AND METHODS FOR LOCATION RECOMMENDATION

(71) Applicant: BEIJING DIDI INFINITY TECHNOLOGY AND DEVELOPMENT CO., LTD., Beijing (CN)

(72) Inventors: Po Hu, Beijing (CN); Ximin Wang, Beijing (CN); Yonggang Xue, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/084,749

(22) Filed: Oct. 30, 2020

(65) Prior Publication Data

US 2021/0064616 A1    Mar. 4, 2021

Related U.S. Application Data

(63) Continuation of application No. PCT/CN2015/114169, filed on Nov. 6, 2018.

(51) Int. Cl.
*G06F 16/24* (2019.01)
*G06F 16/2458* (2019.01)
(Continued)

(52) U.S. Cl.
CPC ...... *G06F 16/2474* (2019.01); *G06F 16/2379* (2019.01); *G06F 16/29* (2019.01);
(Continued)

(58) Field of Classification Search
CPC .. G06F 16/2474; G06F 16/2379; G06N 20/00
See application file for complete search history.

(56) References Cited

U.S. PATENT DOCUMENTS

| | | | |
|---|---|---|---|
| 2016/0364669 A1 | 12/2016 | Wang et al. | |
| 2019/0205838 A1* | 7/2019 | Fang | G06N 20/00 |
| 2020/0080852 A1* | 3/2020 | Sheth | G01C 21/32 |

FOREIGN PATENT DOCUMENTS

| | | | |
|---|---|---|---|
| CN | 104715286 A | 6/2015 | |
| CN | 104796856 A | 7/2015 | |

(Continued)

OTHER PUBLICATIONS

Xuejin Wan et al., Taxi Origin-Destination Areas of Interest Discovering Based on Functional Region Division, Innovative Computing Technology (INTECH), 2013, 6 pages.

(Continued)

*Primary Examiner* — Loc Tran
(74) *Attorney, Agent, or Firm* — Metis IP LLC

(57) ABSTRACT

The present disclosure relates to systems and methods for recommending locations. The systems may receive data related to a plurality of historical service requests, generate a plurality of feature matrices based on each of a plurality of candidate points of interest (POIs) associated with the plurality of historical service requests, generate a set of sample POIs from the plurality of candidate POIs based on the plurality of feature matrices, train a preliminary POI recommendation model using the set of sample POIs with associated feature matrixes; and determine at least one target POI based on a trained POI recommendation model.

15 Claims, 12 Drawing Sheets

(51) Int. Cl.
  *G06N 20/00* (2019.01)
  *G06Q 50/14* (2012.01)
  *G06F 16/23* (2019.01)
  *G06Q 30/02* (2012.01)
  *G06F 16/29* (2019.01)
(52) U.S. Cl.
  CPC ......... *G06N 20/00* (2019.01); *G06Q 30/0205* (2013.01); *G06Q 50/14* (2013.01)

(56) References Cited

FOREIGN PATENT DOCUMENTS

| | | |
|---|---|---|
| CN | 105679009 A | 6/2016 |
| CN | 103631868 B | 2/2017 |
| CN | 108460471 A | 8/2018 |
| KR | 20130045017 A | 5/2013 |

OTHER PUBLICATIONS

Haishan Wu, How to Use Artificial Intelligence to Find Alpha from New Data, Baidu Big Data Lab, 2017, 43 pages.
Hui Xu et al., Research on Location Service Model based on interest Point Association, Science Paper Online; 2017, 9 pages.
International Search Report in PCT/CN2018/114169 dated Aug. 12, 2010, 5 pages.
Written Opinion in PCT/CN2018/114169 dated Aug. 12, 2019, 4 pages.

\* cited by examiner

■ Current location of a service requester

● POI

⌐⌐ AOI

SYSTEMS AND METHODS FOR LOCATION RECOMMENDATION

CROSS-REFERENCE TO RELATED APPLICATIONS

This application is a continuation of International Application NO. PCT/CN2018/114169, filed on Nov. 6, 2018, the entire contents of which are hereby incorporated by reference.

TECHNICAL FIELD

The present disclosure generally relates to systems and methods for online-to-offline services, and in particular, to systems and methods for pick-up location recommendation.

BACKGROUND

With the development of Internet technology, Internet-based online-to-offline services (e.g., online car-hailing service) are becoming increasingly popular. Conventionally, a service requester (e.g., a passenger in an online car-hailing service) may have to manually enter a pick-up location in an online-to-offline service providing application installed in his or her user device each time when he or she initiates an online-to-offline service request. When the description of the pick-up location is not clear or the pick-up location is not easy to be reached, the service provider may need to spend a long time to pick up the service provider. Therefore, it is desirable to provide systems and methods for efficiently providing a pick-up location recommendation for the service requester to avoid the delay caused by the manual input.

SUMMARY

According to an aspect of the present disclosure, a system is provided. The system for generating a POI recommendation model using intelligent data mining may include at least one computer-readable storage medium including a set of instructions, and at least one processor in communication with the at least one computer-readable storage medium. When the at least one processor executes the set of instructions, the at least one processor may be directed to perform one or more of the following operations. The at least one processor may obtain prestored data related to a plurality of historical service requests from a storage device. For each of the plurality of historical service requests, the at least one processor may obtain geographic coordinates of a historical service requester when the historical service request is initiated; determine one or more addresses corresponding to the geographic coordinates of the historical service requester; determine a plurality of candidate points of interest (POIs) around the historical service requester based on the one or more addresses; and generate a plurality of feature matrices, each of the plurality of feature matrices associated with each of the plurality of candidate POIs, based on area information related to the geographic coordinates of a historical service requester, the feature matrix indicating one or more spatial features of each of the plurality of candidate POIs. The at least one processor may generate a set of sample POIs from the plurality of candidate POIs based on the plurality of feature matrices. The at least one processor may iteratively train a preliminary POI recommendation model using the set of sample POIs with associated feature matrixes until the preliminary POI recommendation model converges. The at least one processor may store the trained preliminary POI recommendation model in the at least one computer-readable storage medium.

In some embodiments, the area information may include one or more areas of interest (AOIs) related to the geographic coordinates of the historical service requester determined based on the one or more addresses. To generate a plurality of feature matrices, each of the plurality of feature matrices associated with each of the plurality of candidate POIs, based on area information related to the one or more addresses, the at least one processor may further extract one or more spatial relationships between each of the plurality of candidate POIs and the one or more AOIs. The at least one processor may generate the feature matrix associated with each of the plurality of candidate POIs based on the one or more spatial relationships.

In some embodiments, the area information related to the one or more addresses may include one or more roads related to the one or more addresses. To generate a plurality of feature matrices, each of the plurality of feature matrices associated with each of the plurality of candidate POIs, based on area information related to the one or more addresses, the at least one processor may further extract one or more spatial relationships between each of the plurality of candidate POIs and the one or more roads. The at least one processor may further generate the feature matrix associated with each of the plurality of candidate POIs based on the one or more spatial relationships.

In some embodiments, to generate a set of sample POIs from the plurality of candidate POIs based on the plurality of feature matrices, the at least one processor may further label each of the plurality of candidate POIs based on at least a historical pick-up location related to the corresponding historical service request including: labeling a candidate POI as a positive candidate POI if the candidate POI matches with the historical pick-up location; and labeling a candidate POI as a negative candidate POI if the candidate POI does not match with the historical pick-up location. The at least one processor may further generate a set of positive sample POIs and a set of negative sample POIs based on the labeling.

In some embodiments, the preliminary POI recommendation model may include one or more classifiers, each corresponding to one of the one or more spatial features of each of the plurality of candidate POIs and having a preliminary parameter. To iteratively train a preliminary POI recommendation model using the set of sample POIs with associated feature matrices until the preliminary POI recommendation model converges, the at least one processor may further update the preliminary parameters of the one or more classifiers during the iterative training of the preliminary POI recommendation model.

In some embodiments, to update the preliminary parameters of the one or more classifiers during the iterative training of the preliminary POI recommendation model, the at least one processor may further input a sample POI to the preliminary POI recommendation model. The at least one processor may further determine values of the feature matrix associated with the sample POI, each value indicating whether the sample POI is related to the corresponding spatial feature. The at least one processor may further execute the POI recommendation model to generate an output value in response to the inputted sample POI based on the values of the feature matrix and the one or more preliminary parameters associated with the one or more classifiers. The at least one processor may further obtain a target value based on the label of the sample POI. The at least one processor may further update the one or more preliminary parameters associated with the one or more classifiers by minimizing a difference between the output value and the target value.

In some embodiments, the at least one processor may further determine an optimization score for each of the set of positive sample POIs. The at least one processor may relabel a positive sample POI as a negative sample POI in response to a determination that the optimization score of the positive sample POI is greater than a threshold.

In some embodiments, to determine an optimization score for each of the set of positive sample POIs, the at least one processor may further obtain a first time point from a positive sample POI, the first time point corresponding to an arrival time of a historical service provider at the positive sample POI. The at least one processor may further obtain a second time point from the positive sample POI, the second time point corresponding to a pick-up time of the corresponding historical service request by the historical service provider. The at least one processor may further obtain a time difference between the first time point and the second time point. The at least one processor may further determine the optimization score of the positive sample POI based on the time difference.

In some embodiments, to determine an optimization score for each of the set of positive sample POIs, the at least one processor may further determine a plurality of AOIs related to the geographic coordinates of the historical service requester based on the one or more addresses. The at least one processor may determine the optimization score for each of the set of positive sample POIs based on a spatial relationship between the each of the set of positive sample POIs and the plurality of AOIs.

In some embodiments, the set of positive sample POIs may be divided into a training set of positive sample POIs and a testing set of positive sample POIs. The set of negative sample POIs may be divided into a training set of negative sample POIs and a testing set of negative sample POIs. To train the preliminary POI recommendation model, the at least one processor may train the preliminary POI recommendation model based on the training set of positive sample POIs and the training set of negative sample POIs to generate the trained POI recommendation model. The at least one processor may evaluate the trained POI recommendation model based on the testing set of positive sample POIs and the testing set of negative sample POIs.

According to another aspect of the present disclosure, a system for recommending POIs to a user using intelligent data mining is provided. The system may include at least one computer-readable storage medium including a set of instructions; a data exchange port configured to communicate with a user device via a network; and at least one processor in communication with the data exchange port and the at least one computer-readable storage medium. When the at least one processor executes the set of instructions, the at least one processor may be directed to perform one or more of the following operations. The at least one processor may obtain geographic coordinates of a service requestor from a user device. The at least one processor may execute a pre-trained POI recommendation model based on the geographic coordinates of the service requestor to generate a plurality of POIs associated with the geographic coordinates. The at least one processor may select at least one POI from the plurality of POIs as at least one target POI. The at least one processor may transmit the at least one target POI to the user device of the service requester, wherein the POI recommendation model is pre-trained at least based on one or more spatial features of a plurality of sample POIs related to a plurality of historical service requests.

According to another aspect of the present disclosure, a method is provided. The method may be implemented on a computing device having at least one processor, at least one storage medium and a communication platform connected to a network. The method may include one or more of the following operations. The at least one processor may obtain prestored data related to a plurality of historical service requests from a storage device. For each of the plurality of historical service requests, the at least one processor may obtain geographic coordinates of a historical service requester when the historical service request is initiated; determine one or more addresses corresponding to the geographic coordinates of the historical service requester; determine a plurality of candidate points of interest (POIs) around the historical service requester based on the one or more addresses; and generate a plurality of feature matrices, each of the plurality of feature matrices associated with each of the plurality of candidate POIs, based on area information related to the geographic coordinates of a historical service requester, the feature matrix indicating one or more spatial features of each of the plurality of candidate POIs. The at least one processor may generate a set of sample POIs from the plurality of candidate POIs based on the plurality of feature matrices. The at least one processor may iteratively train a preliminary POI recommendation model using the set of sample POIs with associated feature matrixes until the preliminary POI recommendation model converges. The at least one processor may store the trained preliminary POI recommendation model in the at least one computer-readable storage medium.

In some embodiments, the area information may include one or more areas of interest (AOIs) related to the geographic coordinates of the historical service requester determined based on the one or more addresses. To generate a plurality of feature matrices, each of the plurality of feature matrices associated with each of the plurality of candidate POIs, based on area information related to the one or more addresses, the at least one processor may further extract one or more spatial relationships between each of the plurality of candidate POIs and the one or more AOIs. The at least one processor may generate the feature matrix associated with each of the plurality of candidate POIs based on the one or more spatial relationships.

In some embodiments, the area information related to the one or more addresses may include one or more roads related to the one or more addresses. To generate a plurality of feature matrices, each of the plurality of feature matrices associated with each of the plurality of candidate POIs, based on area information related to the one or more addresses, the at least one processor may further extract one or more spatial relationships between each of the plurality of candidate POIs and the one or more roads. The at least one processor may further generate the feature matrix associated with each of the plurality of candidate POIs based on the one or more spatial relationships.

In some embodiments, to generate a set of sample POIs from the plurality of candidate POIs based on the plurality of feature matrices, the at least one processor may further label each of the plurality of candidate POIs based on at least a historical pick-up location related to the corresponding historical service request including: labeling a candidate POI as a positive candidate POI if the candidate POI matches with the historical pick-up location; and labeling a candidate POI as a negative candidate POI if the candidate POI does not match with the historical pick-up location. The at least one processor may further generate a set of positive sample POIs and a set of negative sample POIs based on the labeling.

In some embodiments, the preliminary POI recommendation model may include one or more classifiers, each corresponding to one of the one or more spatial features of each of the plurality of candidate POIs and having a preliminary parameter. To iteratively train a preliminary POI recommendation model using the set of sample POIs with associated feature matrices until the preliminary POI recommendation model converges, the at least one processor may further update the preliminary parameters of the one or more classifiers during the iterative training of the preliminary POI recommendation model.

In some embodiments, to update the preliminary parameters of the one or more classifiers during the iterative training of the preliminary POI recommendation model, the at least one processor may further input a sample POI to the preliminary POI recommendation model. The at least one processor may further determine values of the feature matrix associated with the sample POI, each value indicating whether the sample POI is related to the corresponding spatial feature. The at least one processor may further execute the POI recommendation model to generate an output value in response to the inputted sample POI based on the values of the feature matrix and the one or more preliminary parameters associated with the one or more classifiers. The at least one processor may further obtain a target value based on the label of the sample POI. The at least one processor may further update the one or more preliminary parameters associated with the one or more classifiers by minimizing a difference between the output value and the target value.

In some embodiments, the at least one processor may further determine an optimization score for each of the set of positive sample POIs. The at least one processor may relabel a positive sample POI as a negative sample POI in response to a determination that the optimization score of the positive sample POI is greater than a threshold.

In some embodiments, to determine an optimization score for each of the set of positive sample POIs, the at least one processor may further obtain a first time point from a positive sample POI, the first time point corresponding to an arrival time of a historical service provider at the positive sample POI. The at least one processor may further obtain a second time point from the positive sample POI, the second time point corresponding to a pick-up time of the corresponding historical service request by the historical service provider. The at least one processor may further obtain a time difference between the first time point and the second time point. The at least one processor may further determine the optimization score of the positive sample POI based on the time difference.

In some embodiments, to determine an optimization score for each of the set of positive sample POIs, the at least one processor may further determine a plurality of AOIs related to the geographic coordinates of the historical service requester based on the one or more addresses. The at least one processor may determine the optimization score for each of the set of positive sample POIs based on a spatial relationship between the each of the set of positive sample POIs and the plurality of AOIs.

In some embodiments, the set of positive sample POIs may be divided into a training set of positive sample POIs and a testing set of positive sample POIs. The set of negative sample POIs may be divided into a training set of negative sample POIs and a testing set of negative sample POIs. To train the preliminary POI recommendation model, the at least one processor may train the preliminary POI recommendation model based on the training set of positive sample POIs and the training set of negative sample POIs to generate the trained POI recommendation model. The at least one processor may evaluate the trained POI recommendation model based on the testing set of positive sample POIs and the testing set of negative sample POIs.

According to another aspect of the present disclosure, a method is provided. The method may be implemented on a computing device having at least one processor, at least one storage medium and a communication platform connected to a network. The method may include one or more of the following operations. The at least one processor may obtain geographic coordinates of a service requestor from a user device. The at least one processor may execute a pre-trained POI recommendation model based on the geographic coordinates of the service requestor to generate a plurality of POIs associated with the geographic coordinates. The at least one processor may select at least one POI from the plurality of POIs as at least one target POI. The at least one processor may transmit the at least one target POI to the user device of the service requester, wherein the POI recommendation model is pre-trained at least based on one or more spatial features of a plurality of sample POIs related to a plurality of historical service requests.

According to another aspect of the present disclosure, a non-transitory computer readable medium is provided. The non-transitory computer readable medium may include at least one set of instructions for generating a POI recommendation model using intelligent data mining. When at least one processor of an electronic terminal executes the at least one set of instructions, the at least one processor may be directed to perform one or more of the following operations. The at least one processor may obtain prestored data related to a plurality of historical service requests from a storage device. For each of the plurality of historical service requests, the at least one processor may obtain geographic coordinates of a historical service requester when the historical service request is initiated; determine one or more addresses corresponding to the geographic coordinates of the historical service requester; determine a plurality of candidate points of interest (POIs) around the historical service requester based on the one or more addresses; and generate a plurality of feature matrices, each of the plurality of feature matrices associated with each of the plurality of candidate POIs, based on area information related to the geographic coordinates of a historical service requester, the feature matrix indicating one or more spatial features of each of the plurality of candidate POIs. The at least one processor may generate a set of sample POIs from the plurality of candidate POIs based on the plurality of feature matrices. The at least one processor may iteratively train a preliminary POI recommendation model using the set of sample POIs with associated feature matrixes until the preliminary POI recommendation model converges. The at least one processor may store the trained preliminary POI recommendation model in the at least one computer-readable storage medium.

According to another aspect of the present disclosure, a non-transitory computer readable medium is provided. The non-transitory computer readable medium may include at least one set of instructions for recommending POIs to a user using intelligent data mining. When at least one processor of an electronic terminal executes the at least one set of instructions, the at least one processor may be directed to perform one or more of the following operations. The at least one processor may obtain geographic coordinates of a service requestor from a user device. The at least one processor may execute a pre-trained POI recommendation model based on the geographic coordinates of the service requestor to generate a plurality of POIs associated with the geographic coordinates. The at least one processor may select at least one POI from the plurality of POIs as at least one target POI. The at least one processor may transmit the at least one target POI to the user device of the service requester, wherein the POI recommendation model is pre-trained at least based on one or more spatial features of a plurality of sample POIs related to a plurality of historical service requests.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
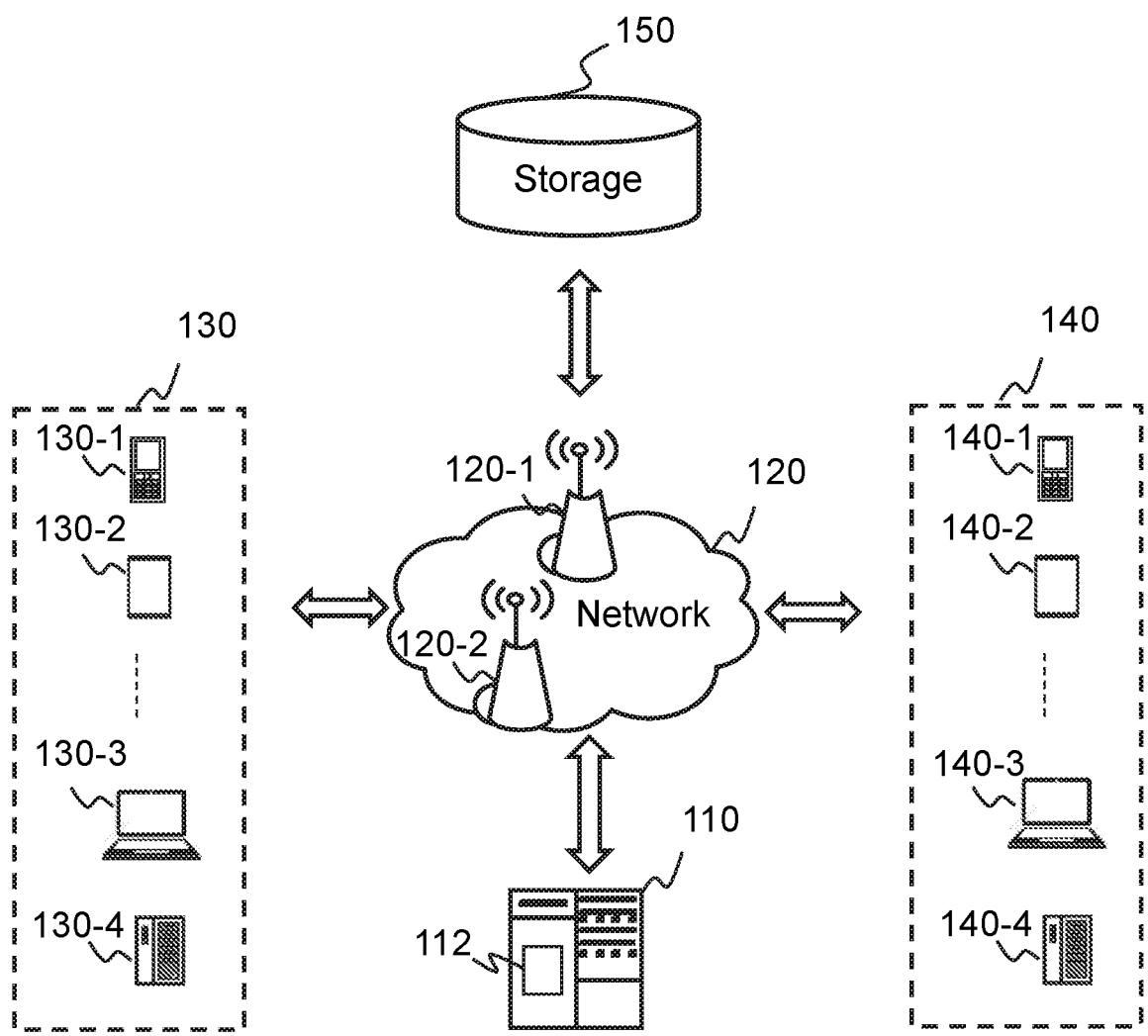
FIG. 1 is a schematic diagram illustrating an exemplary online-to-offline service system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to some embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding online-to-offline service, it should also be understood that this is only one exemplary embodiment. The systems and methods of the present disclosure may be applied to any other kind of online-to-offline service. For example, the systems and methods of the present disclosure may be applied to transportation systems of different environments including land, ocean, aerospace, or the like, or a combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or a combination thereof. The transportation system may also include any transportation system for management and/or distribution, for example, a system for sending and/or receiving an express. The application of the systems and methods of the present disclosure may include a webpage, a plug-in of a browser, a client terminal, a custom system, an internal analysis system, an artificial intelligence robot, or the like, or a combination thereof.

The terms "passenger," "requester," "requester," "service requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure refers to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or a combination thereof. The service request may be accepted by any one of a passenger, a requester, a service requester, a customer, a driver, a provider, a service provider, or a supplier. The service request may be charged or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or a combination thereof. One or more of the above positioning technologies may be used interchangeably in the present disclosure.

The present disclosure relates to systems and methods for generating a POI recommendation model and executing the POI recommendation model. For example, the system may generate a plurality of feature matrices based on each of a plurality of candidate points of interest (POIs) associated with a plurality of historical service requests obtained from a storage device. The system may further generate a set of sample POIs from the plurality of candidate POIs based on the plurality of feature matrices. The system may further Iteratively train a preliminary POI recommendation model using the set of sample POIs with associated feature matrixes until the preliminary POI recommendation model converges to generate a trained POI recommendation model. The system may further execute the trained POI recommendation model to generate a recommended pick-up location based on the current location of a service requester.

It should be noted that online-to-offline service, such as online taxi-hailing services, is a new form of service rooted only in post-Internet era. It provides technical solutions to users and service providers that could raise only in post-Internet era. In the pre-Internet era, when a passenger hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the online-to-offline service system may provide a much more efficient transaction platform for the users and the service providers that may never meet in a traditional pre-Internet online-to-offline service system.

FIG. 1 is a schematic diagram illustrating an exemplary online-to-offline service system according to some embodiments of the present disclosure. For example, the online-to-offline (O2O) service system 100 may be an online transportation service platform for facilitating the requesting and providing of transportation services such as taxi hailing, chauffeur services, delivery vehicles, carpool, bus service, driver hiring, and shuttle services. The online-to-offline service system 100 may include a server 110, a network 120, a requester terminal 130, a provider terminal 140, and a storage 150.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may directly connect the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to a service request to perform one or more functions described in the present disclosure. For example, the processing engine 112 may generate a plurality of feature matrices based on each of a plurality of candidate points of interest (POIs) associated with a plurality of historical service requests. As another example, the processing engine 112 may generate a set of sample POIs based on the plurality of feature matrices. As a further example, the processing engine 112 may train a preliminary POI recommendation model using the set of sample POIs to generate a trained POI recommendation model. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or a combination thereof.

The network 120 may facilitate exchange of information and/or data. In some embodiments, one or more components of the online-to-offline service system 100 (e.g., the server 110, the requester terminal 130, the provider terminal 140, and the storage 150) may transmit information and/or data to another component(s) in the online-to-offline service system 100 via the network 120. For example, the server 110 may receive GPS data from the provider terminal 140 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or a combination thereof. In some embodiments, the network 120 may include one or more network access points. For example, the network 120 may include wired or wireless network access points such as base stations and/or internet exchange points 120-1, 120-2, . . . , through which one or more components of the online-to-offline service system 100 may be connected to the network 120 to exchange data and/or information.

In some embodiments, a service requester may be a user of the requester terminal 130. In some embodiments, the user of the requester terminal 130 may be someone other than the service requester. For example, a user A of the requester terminal 130 may use the requester terminal 130 to transmit a service request for a user B, or receive a service confirmation and/or information or instructions from the server 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a user D, and/or information or instructions from the server 110. In some embodiments, "service requester" and "requester terminal" may be used interchangeably, and "service provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or a combination thereof. In some embodiments, the mobile device 130-1 may include a smart home device, a wearable device, a smart mobile device, a virtual reality device, an augmented reality device, or the like, or a combination thereof. In some embodiments, the smart home device may include a smart lighting device, a control device of an intelligent electrical apparatus, a smart monitoring device, a smart television, a smart video camera, an interphone, or the like, or a combination thereof. In some embodiments, the wearable device may include a smart bracelet, a smart footgear, a smart glass, a smart helmet, a smartwatch, a smart clothing, a smart backpack, a smart accessory, or the like, or a combination thereof. In some embodiments, the smart mobile device may include a smartphone, a personal digital assistant (PDA), a gaming device, a navigation device, a point of sale (POS) device, or the like, or a combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or a combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the provider terminal 140 may periodically transmit GPS data to the server 110. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may transmit positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, removable storage, a volatile read-and-write memory, a read-only memory (ROM), or the like, or a combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof.

In some embodiments, the storage 150 may be connected to the network 120 to communicate with one or more components of the online-to-offline service system 100 (e.g., the server 110, the requester terminal 130, the provider terminal 140). One or more components in the online-to-offline service system 100 may access the data or instructions stored in the storage 150 via the network 120. In some embodiments, the storage 150 may be directly connected to or communicate with one or more components in the online-to-offline service system 100 (e.g., the server 110, the requester terminal 130, the provider terminal 140). In some embodiments, the storage 150 may be part of the server 110. For example, the storage 150 may store information related to a plurality of historical service requests including but not limited to a historical pick-up location, a historical positioning location of a historical service requester of the historical service request, a destination, a start time, an actual time of arrival, an estimated time of arrival (ETA), a time before the service requester is picked up, a finish time, a duration of a service request, a recommended route from a start location to a destination, an actual route, personal information of the service requester or the service provider of a service request, etc. The processing engine 112 or the server 110 may assess the storage 150 to obtain the information related to the plurality of historical service requests or a part thereof via the network 120 or a direct communication.

In some embodiments, one or more components of the online-to-offline service system 100 (e.g., the server 110, the requester terminal 130, the provider terminal 140) may access the storage 150. In some embodiments, one or more components of the online-to-offline service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components of the online-to-offline service system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or a combination thereof. The immaterial product may include a servicing product, a financial product, a knowledge product, an internet product, or the like, or a combination thereof. The internet product may include an individual host product, a web product, a mobile internet product, a commercial host product, an embedded product, or the like, or a combination thereof. The mobile internet product may be used in software of a mobile terminal, a program, a system, or the like, or a combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or a combination thereof. For example, the product may be any software and/or application used on the computer or mobile phone. The software and/or application may relate to socializing, shopping, transporting, entertainment, learning, investment, or the like, or a combination thereof. In some embodiments, the software and/or application relating to transporting may include a traveling software and/or application, a vehicle scheduling software and/or application, mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or a combination thereof.

One of ordinary skill in the art would understand that when an element of the online-to-offline service system 100 performs, the element may perform through electrical signals and/or electromagnetic signals. For example, when a requester terminal 130 processes a task, such as making a determination, identifying or selecting an object, the requester terminal 130 may operate logic circuits in its processor to process such task. When the requester terminal 130 sends out a service request to the server 110, a processor of the requester terminal 130 may generate electrical signals encoding the service request. The processor of the requester terminal 130 may then send the electrical signals to an output port. If the requester terminal 130 communicates with the server 110 via a wired network, the output port may be physically connected to a cable, which may further transmit the electrical signals to an input port of the server 110. If the requester terminal 130 communicates with the server 110 via a wireless network, the output port of the requester terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requester terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal refers to one electrical signal, a series of electrical signals, and/or a plurality of discrete electrical signals.

Figure 2:
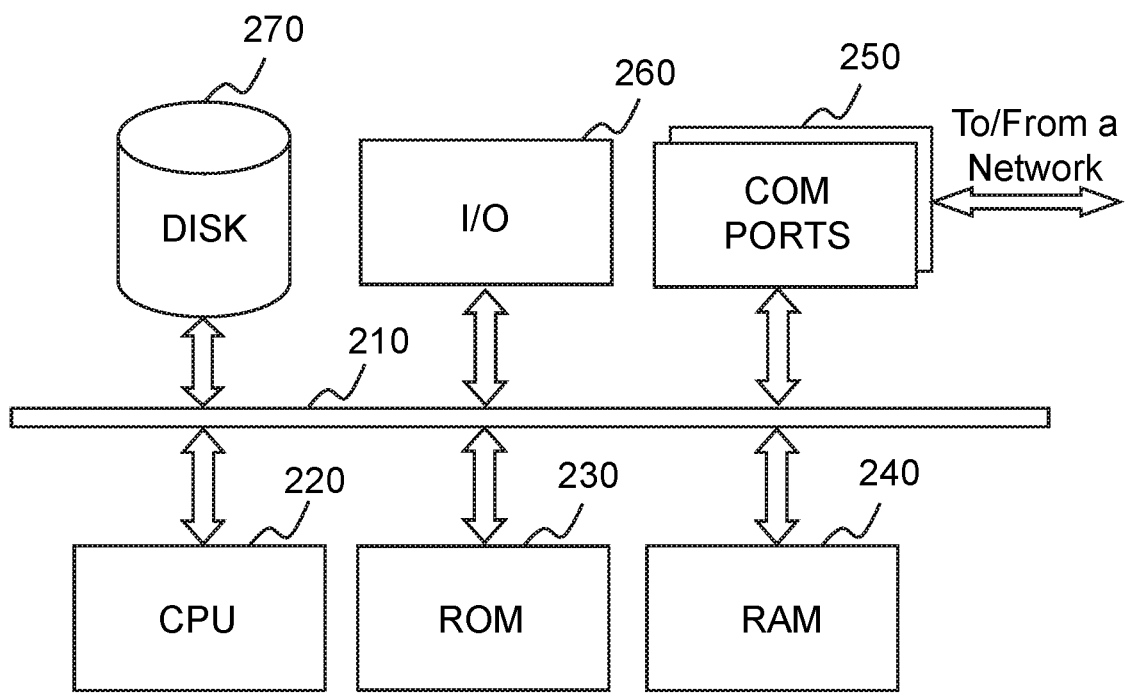
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the server 110, the requester terminal 130, and/or the provider terminal 140 may be implemented on the computing device 200. For example, the processing engine 112 may be implemented on the computing device 200 and configured to perform functions of the processing engine 112 disclosed in this disclosure.

The computing device 200 may be used to implement any component of the online-to-offline service system 100 as described herein. For example, the processing engine 112 may be implemented on the computing device 200, via its hardware, software program, firmware, or a combination thereof. Although only one such computer is shown, for convenience, the computer functions relating to the online-to-offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. The processor 220 may train a preliminary model based on a plurality of historical service requests to generate a trained POI recommendation model. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The plurality of historical servive requests and the trained POI recommendation model may be stored in the ROM 230 and/or RAM 240. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method operations performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
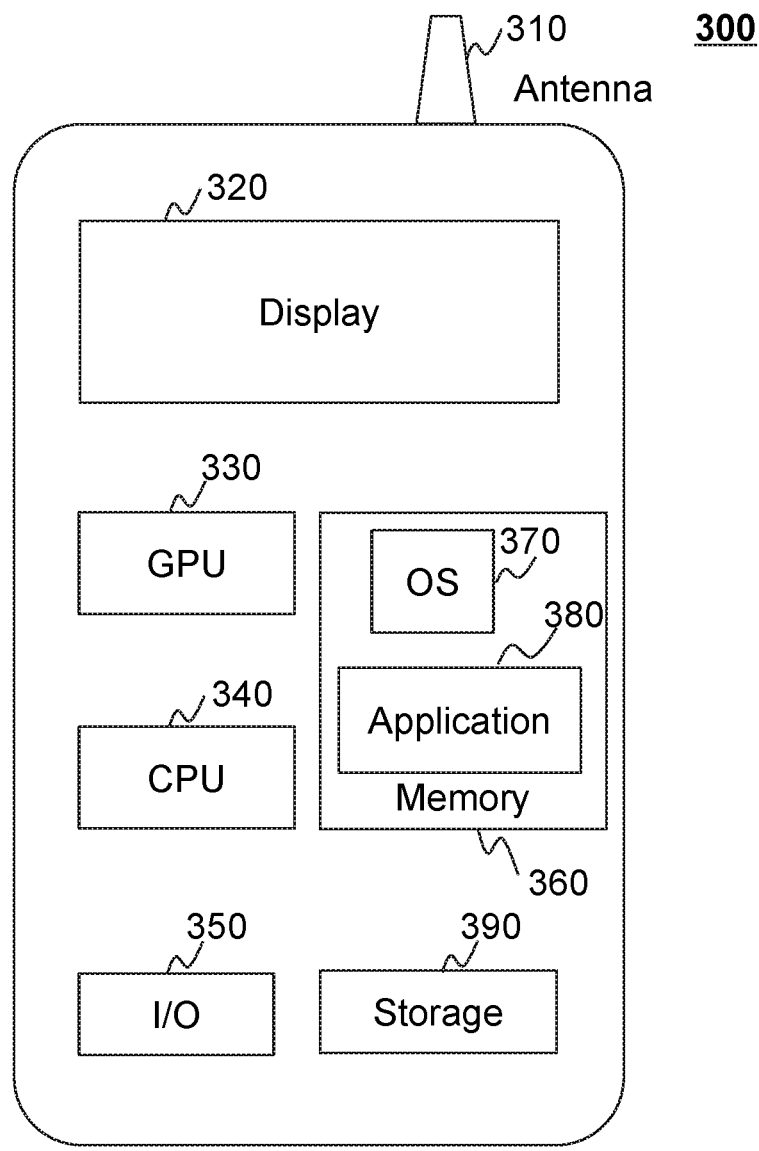
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the requester terminal 130 or the provider terminal 140 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to online-to-offline services or other information from the online-to-offline service system 100. User interactions with the information stream may be achieved via the I/O 350 and provided to the processing engine 112 and/or other components of the online-to-offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
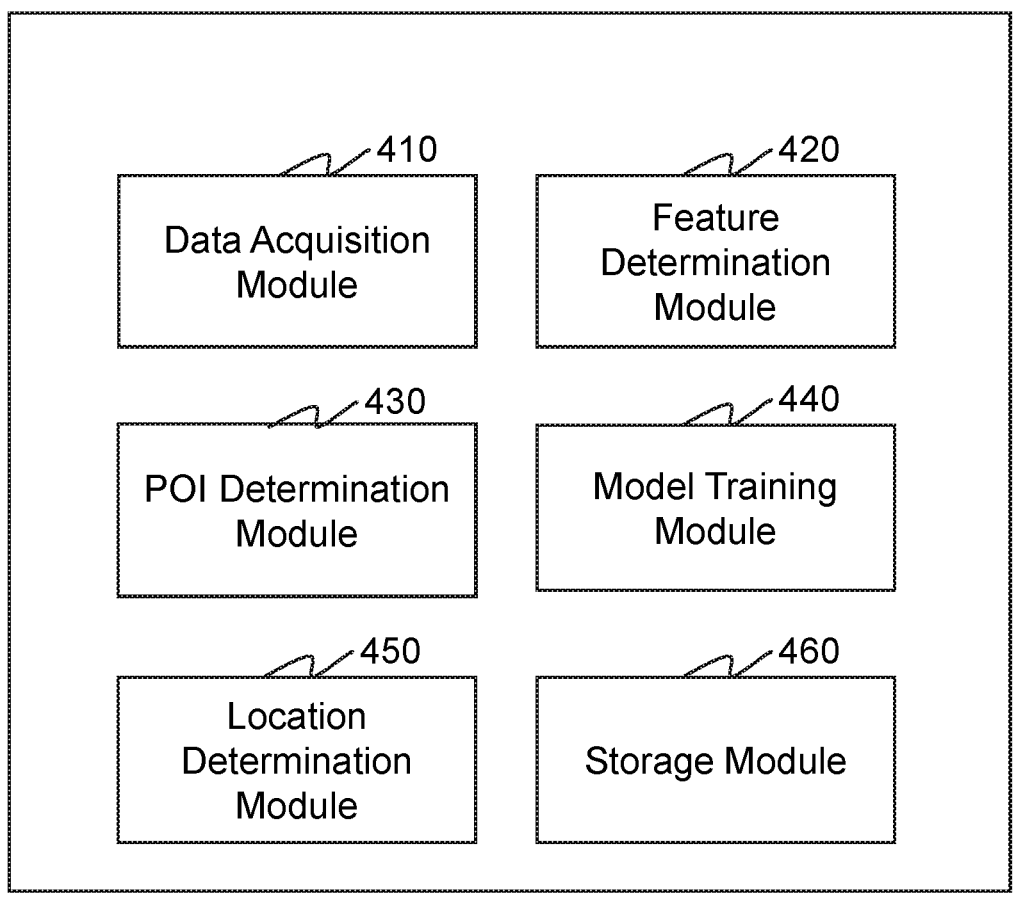
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include a data acquisition module 410, a feature determination module 420, a POI determination module 430, a model training module 440, a location determination module 450, and a storage module 460.

The data acquisition module 410 may obtain data related to a plurality of historical service requests. In some embodiments, the data related to the plurality of historical service requests may include a plurality of geographic coordinates, a plurality of historical pick-up locations, a driving route, a start time, a completion time, a duration, or the like, or any combination thereof. In some embodiments, the data acquisition module 410 may obtain the data related to a plurality of historical service requests from a storage device (e.g., a storage device of the requestor terminal 130, the storage 150, storage device(s) of any other device or module in the online-to-offline service system 100) via the network 120.

The data acquisition module 410 may further obtain geographic coordinates of a service requester from a user device (e.g., the requester terminal 130). The geographic coordinates of the service requester may be associated with a service request that may be sent by a passenger for a car hailing service. The geographic coordinates of the service requester may indicate the current location of the service requester when the service requester initiates the service request.

The feature determination module 420 may generate a plurality of feature matrices based on each of a plurality of candidate points of interest (POIs). The plurality of candidate POIs may be around the location of a historical service requester when a historical service request is initiated. Each of the plurality of feature matrices may correspond to a candidate POI of the plurality of candidate POIs. A feature matrix corresponds to a candidate POI may include basic information of the candidate POI, road network information of one or more roads near the candidate POI, one or more areas of interest (AOIs) near the candidate POI and a current location associated with the candidate POI. Detailed descriptions regarding the feature matrix may be found elsewhere in the present disclosure (e.g., in connection with FIG. 6).

The POI determination module 430 may generate a set of sample POIs from the plurality of candidate POIs based on the plurality of feature matrices. Each of the set of sample POIs may include one or more addresses determined using a Reverse geocoding (Rgeo) technique described in connection with FIG. 6. The set of sample POIs may include a set of positive sample POIs and a set of negative sample POIs. A positive sample POI may correspond to a historical pick-up location of a service request. A negative sample POI may not correspond to a historical pick-up location of a service request.

The model training module 440 may train a preliminary POI recommendation model using the set of sample POIs with associated feature matrices to generate a trained POI recommendation model. The model training module 440 may obtain the set of sample POIs from the POI determination module 430 and the associated feature matrices from the feature determination module 420 and train a preliminary POI recommendation model based on the set of sample POIs and the associated feature matrices. Each of the set of sample POIs may include a target value indicating whether the sample POI corresponds to a historical pick-up location of a service request.

The preliminary POI recommendation model may generate an output value based on input values of the feature matrix of a sample POI. The output value may be determined based on a plurality of classifiers included in the preliminary POI recommendation model. Each of the plurality of classifiers may correspond to a particular feature in a feature matrix of an inputted sample POI. Each classifier may output a score indicating a probability that the inputted sample POI being a pick-up location of a service request regarding the corresponding feature.

The model training module 440 may update the preliminary POI recommendation model by minimizing a difference between the output value and the target value based on a gradient descent method. The model training module 440 may generate the trained POI recommendation model when the updating of the preliminary POI recommendation model is determined to be completed according to a convergence condition.

The location determination module 450 may determine at least one recommended pick-up location for a service requester when the service requester initiates a service request. The location determination module 450 may determine at least one POI from a plurality of POIs around geographic coordinates of the service requester as the at least one recommended pick-up location. The location determination module 450 may execute a pre-trained POI recommendation model based on the plurality of POIs to generate a plurality of scores. For example, the location determination module 450 may use one of the plurality of POIs as the input of the pre-trained POI recommendation model, and the pre-trained POI recommendation model may generate a score of the appropriateness of the POI being a recommended pick-up location as an output. In this way, the location determination module 450 may determine the plurality of scores corresponding to the plurality of POIs. The location determination module 450 may select, based on the plurality of scores, at least one POI from the plurality of POIs as the at least one recommended pick-up location. The location determination module 450 may further transmit the at least one recommended pick-up location to the user device of the service requester.

The storage module 460 may store the data related to a plurality of historical service requests, the geographic coordinates of a service requester, the set of sample POIs, the preliminary POI recommendation model, the trained POI recommendation model, the at least one recommended pick-up location, or the like, or any combination thereof. In some embodiments, the storage module 460 may store one or more programs and/or instructions that may be executed by the processor(s) of the processing engine 112 to perform exemplary methods described in this disclosure. For example, the storage may store program(s) and/or instruction(s) that may be executed by the processor(s) of the processing engine 112 to cause the online-to-offline service system 100 or a portion thereof to recommend a pick-up location based on a service request, etc. In some embodiments, the storage module 460 may store one or more algorithms to be employed by the location determination module 450. In some embodiments, the storage module 460 may include a mass storage. For example, the mass storage may include a magnetic disk, an optical disk, a solid-state drive, etc.

The modules in the processing engine 112 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 5:
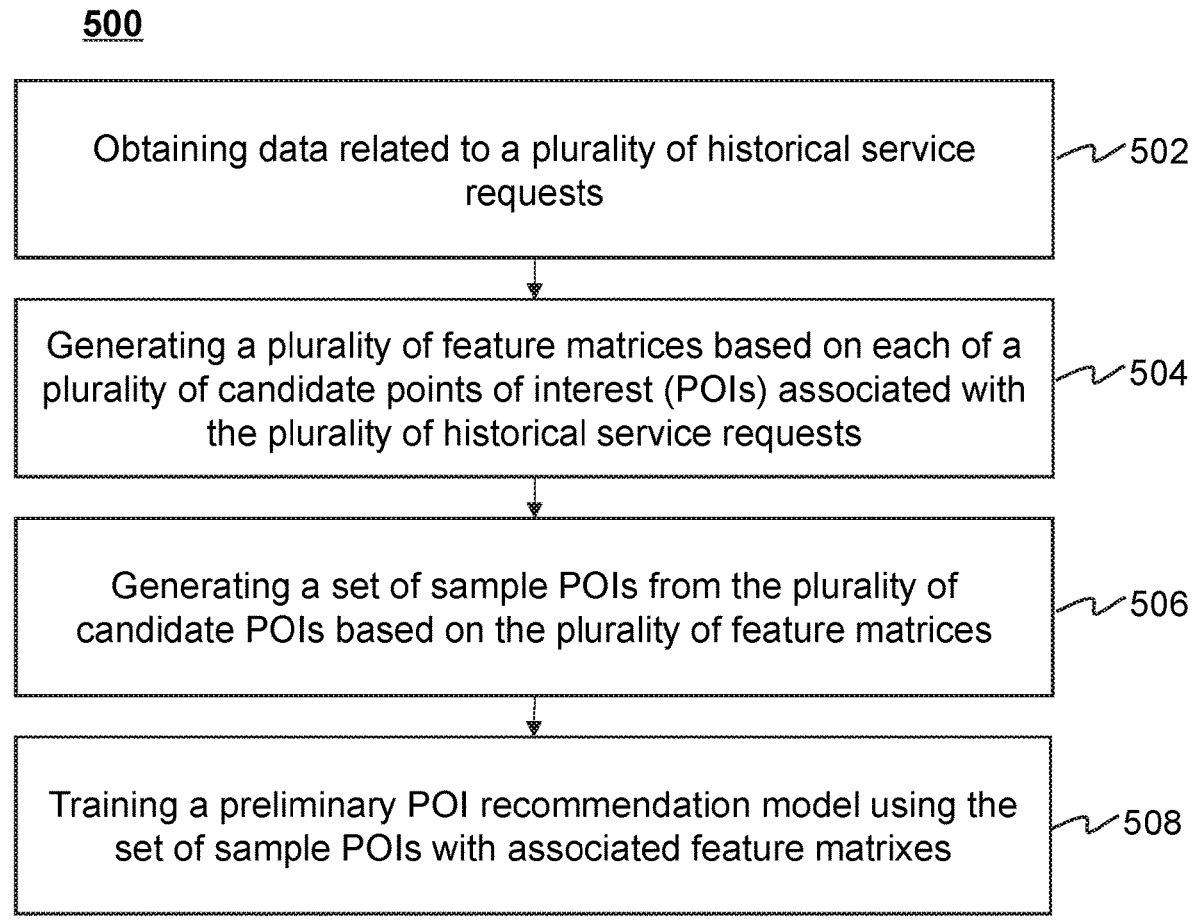
FIG. 5 is a flowchart illustrating an exemplary process for generating a POI recommendation model according to some embodiments of the present disclosure.

FIG. 5 is a flowchart illustrating an exemplary process for generating a POI recommendation model according to some embodiments of the present disclosure. The process 500 may be executed by the online-to-offline service system 100. For example, the process 500 may be implemented as a set of instructions (e.g., an application) stored in the storage 150, the ROM 230 or the RAM 240. The server 110, the processing engine 112, the processor 220 and/or modules in the FIG. 4 may execute the set of instructions, and when executing the instructions, the server 110, the processing engine 112, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 502, the processing engine 112 (e.g., the data acquisition module 410) may obtain data related to a plurality of historical service requests. In some embodiments, the data related to the plurality of historical service requests may include a plurality of geographic coordinates, a plurality of historical pick-up locations, a driving route, a start time, a completion time, a duration, or the like, or any combination thereof. As used herein, the geographic coordinates may include longitude, latitude, and/or altitude of point locations, such as start locations, pick-up locations, destinations, road intersections, and/or intermediate locations on routes from start locations to the destinations. The data related to the plurality of historical service requests may be stored in a storage device (e.g., a storage device of the requestor terminal 130, the storage 150, storage device(s) of any other device or module in the online-to-offline service system 100). In some embodiments, the processing engine 112 may obtain the data related to the plurality of historical service requests from the storage device via the network 120. For example, the processing engine 112 may obtain geographic coordinates of the positioning location of the requester terminal 130 of a service requester via e.g., a GPS chip implemented on the requester terminal 130 when the service requester initiates a service request from the requester terminal 130 and a pick-up location where a service provider picked up the service requester.

As used herein, a service request may be sent by a service requester for a service (e.g., a taxi hailing service) to the online-to-offline service system 100. A service provider may accept the service request and provide the service to the requester. After the completion of the service request, the online-to-offline service system 100 may store information related to the service request in a storage device (e.g., the storage 150) as a historical service request. The stored information related to the service request may include but not limited to a location of the service requester, a historical pick-up location, a historical destination, a historical start time, a historical time of arrival (also referred to as "actual time of arrival"), etc.

In 504, the processing engine 112 (e.g., the feature determination module 420) may generate a plurality of feature matrices based on each of a plurality of candidate points of interest (POIs) associated with the plurality of historical service requests. Each of the plurality of feature matrices may correspond to a candidate POI of the plurality of candidate POIs. In some embodiments, if the candidate POIs does not exist in the historical service requests at the time the historical service requests were stored in the storage device, they may be added later to the storage device when the historical service requests are processed to generate a POI recommendation model. More descriptions regarding the generation of the plurality of feature matrices may be found elsewhere in the present disclosure (e.g., FIG. 6 and the descriptions thereof).

In 506, the processing engine 112 (e.g., the POI determination module 430) may generate a set of sample POIs from the plurality of candidate POIs based on the plurality of feature matrices. Each of the set of sample POIs may include one or more addresses determined using a Reverse geocoding (Rgeo) technique described in connection with FIG. 6. The set of sample POIs may include a set of positive sample POIs and a set of negative sample POIs. Each positive sample POI may have a label of a value "1" while each of the negative sample POI may have a label of a value "0". For example, a sample POI that is a target POI is labeled with a value "1" or "Yes." In another example, a sample POI that is a target POI is labeled with a value "0" or "No." In yet another example, a sample POI that is not a target POI is labeled with a value "1" or "Yes." A positive sample POI may correspond to a historical pick-up location of a service request. A negative sample POI may not correspond to a historical pick-up location of a service request. In some embodiments, the processing engine 112 may generate the set of sample POIs by deleting one or more inappropriate candidate POIs (the inappropriate candidate POIs may be determined by e.g., process 606 in FIG. 6, and the descriptions thereof) from the plurality of candidate POIs and labelling each of the remaining candidate POIs as a positive sample POI or a negative sample POI. More descriptions regarding the generation of the set of sample POIs may be found elsewhere in the present disclosure (e.g., FIG. 7 and the descriptions thereof).

In 508, the processing engine 112 (e.g., the model training module 440) may train a preliminary POI recommendation model using the set of sample POIs with associated feature matrices to generated a trained POI recommendation model. For example, the processing engine 112 may obtain the set of sample POIs from the POI determination module 430 and the associated feature matrices from the feature determination module 420 and train a preliminary POI recommendation model based on the set of sample POIs and the associated feature matrices. More descriptions regarding the training of the preliminary POI recommendation model may be found elsewhere in the present disclosure (e.g., FIGS. 8 and 11, and the descriptions thereof).

In some embodiments, before storing a trained preliminary POI recommendation model, the processing engine 112 may determine whether the trained preliminary POI recommendation model is qualified for real-time POI recommendation. In response to a determination that the trained preliminary POI recommendation model is qualified, the processing engine 112 may store the trained preliminary POI recommendation model. In response to a determination that the trained preliminary POI recommendation model is not qualified, the processing engine 112 may further train the trained preliminary POI recommendation model until it is qualified. For example, the processing engine 112 may determine the whether the trained preliminary POI recommendation model is qualified using a test group. More particularly, the processing engine 112 may divide the set of sample POIs into a training group of sample POIs and a test group of sample POIs. For example, the processing engine 112 may determine 80% of the set of sample POIs as the training group and 20% of the set of sample POIs as the test group. The training group may be used to train the preliminary POI recommendation model, for example, to construct and update parameters (e.g., weights) of classifiers in the preliminary POI recommendation model. The test group may be used to assess a performance of the POI recommendation model trained by the training group. The processing engine 112 may input a feature matrix associated with a sample POI in the test group to the trained preliminary POI recommendation model to generate an output value. The processing engine 112 may determine that the prediction of the trained POI recommendation model regarding the inputted sample POI is accurate if the difference between the output value and a target value associated with the inputted sample POI is within an accuracy threshold. Otherwise, the processing engine 112 may determine that the prediction of the trained POI recommendation model regarding the inputted sample POI is not accurate. In some embodiments, the accuracy threshold may be preset by a user and/or the online-to-offline service system 100, and/or may be adjustable under different situations. In some embodiment, the processing engine 112 may determine an average difference between the output values and target values associated with the sample POIs in the test group and compare the average difference with the accuracy threshold to access the performance of the trained POI recommendation model. In some embodiments, the processing engine 112 may compare the output value and target value associated with each of the samples POIs in the test group with the accuracy threshold and determine a proportion of accurately predicted samples among all of the sample POIs in the test group. The proportion of accurately predicted samples may then be used to assess the performance of the trained POI recommendation model. The assessment of the performance of the trained POI recommendation model by the test group may not incur any change of the parameters of the model. In some embodiments, the processing engine 112 may store the trained preliminary POI recommendation model in a storage device (e.g., the storage 150) disclosed elsewhere in the present disclosure.

Figure 6:
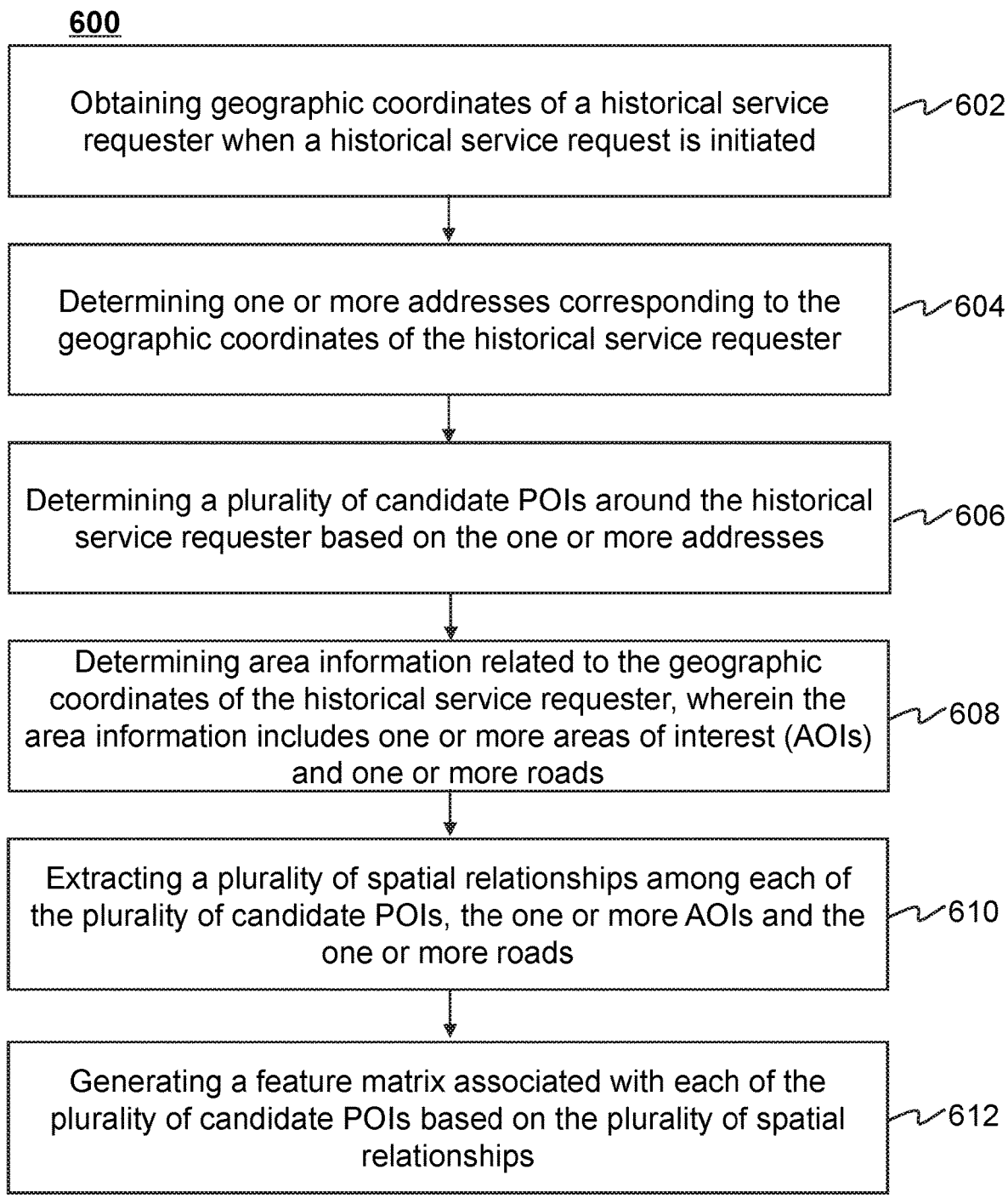
FIG. 6 is a flowchart illustrating an exemplary process for generating a feature matrix based on a POI according to some embodiments of the present disclosure.

FIG. 6 is a flowchart illustrating an exemplary process for generating a feature matrix based on a POI according to some embodiments of the present disclosure. The process 600 may be executed by the online-to-offline service system 100. For example, the process 600 may be implemented as a set of instructions (e.g., an application) stored in the storage 150, the ROM 230 or the RAM 240. The server 110, the processing engine 112, the processor 220 and/or modules in the FIG. 4 may execute the set of instructions, and when executing the instructions, the server 110, the processing engine 112, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting. In some embodiments, process 600 may correspond to the operation 504 of process 500.

In 602, the processing engine 112 (e.g., the feature determination module 420) may obtain geographic coordinates of a historical service requester when a corresponding historical service request is initiated by the historical service requester. The historical service requester may be a passenger requesting for a car hailing service. The geographic coordinates of the historical service requester may indicate a current location of the passenger when the passenger initiates the historical service request for the car hailing service. In some embodiments, the current location of the historical service requester may be the current location of a user device associated with the historical service requester (e.g., a requester terminal 130), which may be determined by a GPS unit of the user device (e.g., GPS chipset). The processing engine 112 may store the geographic coordinates in a storage device disclosed elsewhere in the present disclosure (e.g., the storage 150).

In 604, the processing engine 112 (e.g., the feature determination module 420) may determine one or more addresses corresponding to the geographic coordinates of the historical service requester. In some embodiments, the processing engine 112 may determine the one or more addresses using a reverse geocoding (Rgeo) technique. The Rgeo technique may be a process of reverse coding the geographic coordinates to one or more readable addresses or names. The processing engine 112 may reverse code the geographic coordinates by calling an Application programming interface (API) with a Rgeo function (e.g., a Baidu API, an Autonavi API, a Google API). For example, the one or more addresses may include a street number, a street, a city, a state, a country, a postal code, or the like, or any combination thereof.

In 606, the processing engine 112 (e.g., the feature determination module 420) may determine a plurality of candidate POIs around the historical service requester based on the one or more addresses. As used herein, the term "POI" refers to information related to a POI, including but not limited to the location or address of the POI, the name of the POI name (location name), the geographic coordinates of the POI, etc. In some embodiments, the processing engine 112 may determine the plurality of candidate POIs using a locals service. The locals service is a service of outputting a plurality of POIs within a preset range (e.g., 800 meters, 500 meters) from a location indicated by an inputted address. For example the locals service may be achieved using a database including a plurality of POIs and their corresponding addresses.

In some embodiments, the processing engine 112 may delete one or more inappropriate POIs from the plurality of candidate POIs. The processing engine 112 may delete the one or more POIs based on user behaviors, distances between each of the one or more POIs and the current location, location of the one or more POIs, or the like, or any combination thereof. For example, the processing engine 112 may treat a POI with a location above or under the ground (e.g., an underground parking slot, a 15th floor of a building) as an inappropriate POI and delete it from the plurality of POIs. The user behaviors may include operations done by the user on a service requesting and providing APP (e.g., "DiDi Taxi"). The processing engine 112 may treat a POI that is selected by a service requester using excessive times of operations on the APP as an inappropriate POI and delete it from the plurality of POIs.

In 608, the processing engine 112 (e.g., the feature determination module 420) may determine area information related to the geographic coordinates of the historical service requester. The area information may include one or more areas of interest (AOIs) related to the geographic coordinates of the historical service requester and one or more roads related to the geographic coordinates.

As used herein, an AOI may refer to a region of a relative small area. For example, an AOI may be a building in a university, a gate of a residential community, an exit of a park, or the like, or any combination thereof. In some embodiments, the processing engine 112 may dividing the region around the location indicated by the one or more addresses into one or more AOIs. The location indicated by the one or more addresses may be inside, outside or at or near the boundary of the one or more AOIs.

The one or more roads related to the one or more addresses may be a road segment or a road intersection near the location indicated by the one or more addresses. The one or more roads may further include road network information (e.g., a road hierarchy, a driving direction of roads, a road setting). The road hierarchy may include a first-level road (e.g., an expressway, a national road), a second-level road (e.g., a provincial road), a third-level road (e.g., an elevated road), or the like, or any combination thereof. The driving direction of roads may include one-way and two-way. The road setting may include information related to isolation zones, sidewalk, traffic rules, or the like, or any combination thereof, associated with the one or more roads. In some embodiments, the processing engine 112 may determine the one or more roads using a locals service as described above.

In 610, the processing engine 112 (e.g., the feature determination module 420) may extract a plurality of spatial relationships among each of the plurality of candidate POIs, the one or more AOIs and the one or more roads. In some embodiments, the plurality of spatial relationships may include one or more first spatial relationships between each of the plurality of candidate POIs and the one or more AOIs, one or more second spatial relationships between each of the plurality of candidate POIs and the one or more roads.

For example, the first spatial relationship between the candidate POI and the AOI may include that the candidate POI is inside the AOI, the candidate POI is outside the AOI, or the candidate POI is at or near the boundary of the AOI. For another example, the second spatial relationship between the candidate POI and the road may be that the candidate POI is on a left side of the road, the candidate POI is on a right side of the road, or the candidate POI is at a road intersection.

In some embodiments, the plurality of spatial relationships may further include one or more third spatial relationships between the current location and the plurality of candidate POIs with respect to a road of the one or more roads, and one or more fourth spatial relationships between the current location and the one or more roads. For example, the third spatial relationship between the candidate POI and the current location may be that the candidate POI and the current location are on the same side of a road, or the candidate POI and the current location are on different sides of a road. In some embodiments, the processing engine 112 may determine the one or more third spatial relationships based on the one or more second spatial relationships and the one or more fourth spatial relationships between the current location and the one or more roads. The fourth spatial relationship between the current location and a road may be that the current location is on a left side of the road, or the current location is on a right side of the road. For example, the candidate POI and the current location are on the same side of the road if both of them are on the left or right side of the road. The candidate POI and the current location are on the different sides of the road if one of them is on the left side of the road and the other one of them is on the right side of the road.

Alternatively, the processing engine 112 may determine the one or more third spatial relationships based on the current location, the plurality of candidate POIs and the one or more roads. For example, the processing engine 112 may virtually connect the current location and the candidate POI by a line, and determine the third spatial relationship between the current location and the candidate POI based on the spatial relationship between the line and the road. The processing engine 112 may determine the candidate POI and the current location are on the same side of the road if the line does not intersect with the road. The processing engine 112 may further determine the candidate POI and the current location are on different sides of the road if the line intersects with the road.

In 612, the processing engine 112 (e.g., the feature determination module 420) may generate a feature matrix associated with each of the plurality of candidate POIs based on the plurality of spatial relationships. The feature matrix may include basic information of the candidate POI, road network information of one or more roads near the candidate POI, and relationships between the candidate POI, the one or more AOIs and the current location. For example, the feature matrix associated with the candidate POI may include information about whether the candidate POI and the current location are on the same side of a road, road network information of the associated road (e.g., a road hierarchy, a driving direction of roads, a road setting), information about whether the candidate POI is inside an AOI, the distance between the candidate POI and the current location, or the like, or any combination thereof. Similarly, the processing engine 112 may generate a feature matrix associated with each of the one or more AOIs. In a case that a candidate POI resides in an AOI, the feature matrix associated with the POI may be determined based on a feature matrix associated with the AOI.

In some embodiments, the processing engine 112 may describe the feature matrix using binary numbers (e.g., zeros and ones). For example, the processing engine 112 may describe information about whether the candidate POI and the current location are on the same side of a road using a feature matrix including a binary number, e.g., a [1] indicating that the candidate POI and the current location are on the same side of a road and a [0] indicating that the candidate POI and the current location are on different sides of a road. As another example, processing engine 112 may describe the road hierarchy using a feature matrix including four binary numbers (can also be two binary numbers), e.g., a [0, 0, 0, 1] indicating that the road is an elevated road, a [0, 0, 1, 0] indicating that the road is an expressway, a [0, 1, 0, 0] indicating that the road is a provincial road, and a [1, 0, 0, 0] indicating that the road is a national road.

Figure 7:
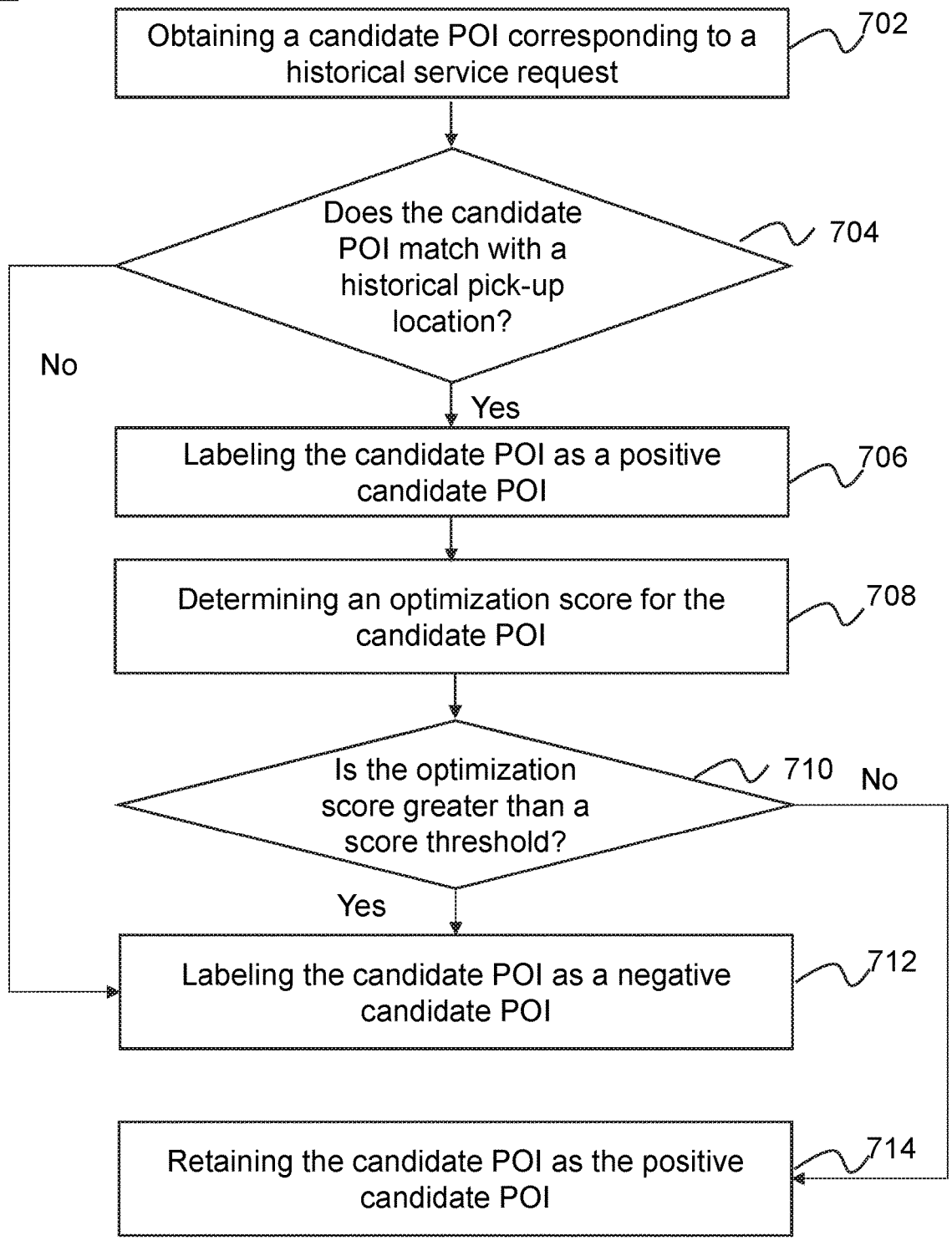
FIG. 7 is a flowchart illustrating an exemplary process for labeling a POI according to some embodiments of the present disclosure.

FIG. 7 is a flowchart illustrating an exemplary process for labeling a POI according to some embodiments of the present disclosure. The process 700 may be executed by the online-to-offline service system 100. For example, the process 700 may be implemented as a set of instructions (e.g., an application) stored in the storage 150, the ROM 230 or the RAM 240. The server 110, the processing engine 112, the processor 220 and/or modules in the FIG. 4 may execute the set of instructions, and when executing the instructions, the server 110, the processing engine 112, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting. In some embodiments, process 700 may correspond to the operation 506 of process 500.

In 702, the processing engine 112 (e.g., the POI determination module 430) may obtain a candidate POI corresponding to a historical service request. In some embodiments, the processing engine 112 may obtain the candidate POI from the feature determination module 420 or the storage 150 via the network 120.

In 704, the processing engine 112 (e.g., the POI determination module 430) may determine whether the candidate POI matches with a historical pick-up location. The historical pick-up location may be the pick-up location of the historical service request. The processing engine 112 may determine that the candidate POI matches with the historical pick-up location if the candidate POI coincides with the historical pick-up location; otherwise, the processing engine 112 may determine that the candidate POI does not match with the historical pick-up location. As used herein, the "coincides" may refer to that the candidate POI and the historical pick-up location are sufficiently close to each other (e.g., with a difference of 0 or a few meters therebetween only due to positioning errors) and/or are the same in their names of addresses.

In response to the determination that the candidate POI matches the historical pick-up location, the process 700 may proceed to operation 706; otherwise, the process 700 may proceed to operation 708.

In 706, the processing engine 112 (e.g., the POI determination module 430) may label the candidate POI as a positive candidate POI. The processing engine 112 may assign different values to the label (e.g., a "is_target" label) of the candidate POI. For example, a value of "1" may be assigned to the "is_target" label of a positive candidate POI while a value of "0" may be assigned to the "is_target" label of a negative candidate POI.

In 708, the processing engine 112 (e.g., the POI determination module 430) may determine an optimization score for the candidate POI. The optimization score may be an index other than the label that describes the likelihood of the candidate POI being recommended as the pick-up location of the service request. For example, a candidate POI with an optimization score of 90 may be highly recommended as a good pick-up location while a candidate POI with an optimization score of 30 may be unlikely to be recommended as a good pick-up location (even though both of them are historical pick-up locations). In some embodiments, the processing engine 112 may determine the optimization score of the candidate POI based on a visibility of the candidate POI and an accuracy of the candidate POI.

The visibility of the candidate POI may indicate how easy the service provider and the service requester can reach a consensus on the candidate POI (e.g., a consensus on the name or exact location of the candidate POI). The higher the visibility, the easier it is for the service provider to pick up the service requester at the candidate POI. The processing engine 112 may determine the visibility based on a waiting time, the distance between the candidate POI and an actual pick-up location, a communication time between the service provider and the service requester, a popularity of the candidate POI, or the like, or any combination thereof. As used herein, the waiting time may be a time interval between an arrival time of the historical service provider at the candidate POI (also referred to as a first time point), and a pick-up time of the corresponding historical service request by the historical service provider at the candidate POI (also referred to as a second time point). For example, the visibility may be good if the waiting time is short. As used herein, the popularity of a POI may relate to the number of searches, clicks, of the POI in a service requesting and providing APP within a certain time period (e.g., three months, six months, one year, etc.). In some embodiments, the visibility may not be good enough if there is a long communication (e.g. via phone, via massage) between the service provider and the service requester regarding the candidate POI.

The accuracy of the candidate POI may indicate how well the candidate POI matches with the pick-up location. The processing engine 112 may determine the accuracy based on one or more first spatial relationships between the candidate POI and the one or more AOIs and one or more fifth spatial relationship relationships between the current location and the one or more AOIs. In some embodiments, the current location may be the current location of the service requester when the service requester initiates the service request. The fifth spatial relationship between the current location of the service requester and an AOI may include that the current location is inside, outside, or at or near the boundary of the AOI. For example, in response to a determination that an AOI is a residential community and the current location of the service requester is inside the AOI, the processing engine 112 may determine that a candidate POI outside the AOI (e.g., a shop around the AOI) is less likely to be the pick-up location while a candidate POI at an entrance and/or an exit of the AOI near the current location of the service requester is more likely to be the pick-up location. For another example, in response to a determination that an AOI is a residential community and the current location of the service requester is outside the AOI, the processing engine 112 may determine a candidate POI outside the AOI (e.g., a shop around the AOI, a bus station) is more likely to be the pick-up location while a candidate POI at an entrance and/or an exit of the AOI far from the current location of the service requester or inside the AOI is less likely to be the pick-up location.

In some embodiments, before operation 708, the processing engine 112 may determine whether the candidate POI satisfies at least one of a plurality of conditions (Not shown in FIG. 7). The plurality of conditions may be associated with the distance between the candidate POI and the current location of the service requester, the distance between the candidate POI and a road intersection, the distance between the candidate POI and a bus station, the name of the candidate POI, the position of the candidate POI, or the like, or any combination thereof. In response to a determination that the candidate POI satisfies at least one of a plurality of conditions, the process 700 may proceed to 712 directly; otherwise, the processing engine 112 may proceed to operation 708 as usual. For example, the process 700 may proceed to 712 directly, if the distance between the candidate POI and the current location of the service requester is greater than 150 meters. As another example, the process 700 may proceed to 712 directly, if the name of the candidate POI is very long. As a further example, the process 700 may proceed to 712 directly, if the position of candidate POI is near or at an unsuitable place (e.g., an entrance or an exit of a parking lot, inside a building, a public lavatory).

In 710, the processing engine 112 (e.g., the POI determination module 430) may determine whether the optimization score is greater than a score threshold. In some embodiments, the score threshold may be preset by a user and/or the online-to-offline service system 100, or may be adjustable under different situations. For example, the score threshold may be 40, 50, 60, etc. In response to a determination that the optimization score is greater than the score threshold, the process 700 may proceed to 712; otherwise, the process 700 may proceed to operation 714.

In 712, the processing engine 112 (e.g., the POI determination module 430) may label the candidate POI as a negative candidate POI. In some embodiments, the processing engine 112 may label the candidate POI as a negative candidate POI in response to a determination that the candidate POI does not match the historical pick-up location. In some embodiments, the candidate POI may be originally labelled as a positive candidate POI, and relabeled as a negative candidate POI in response to a determination that an optimization score associated with the positive candidate POI is greater than the score threshold.

In 714, the processing engine 112 (e.g., the POI determination module 430) may retain the candidate POI as the positive candidate POI.

Figure 8:
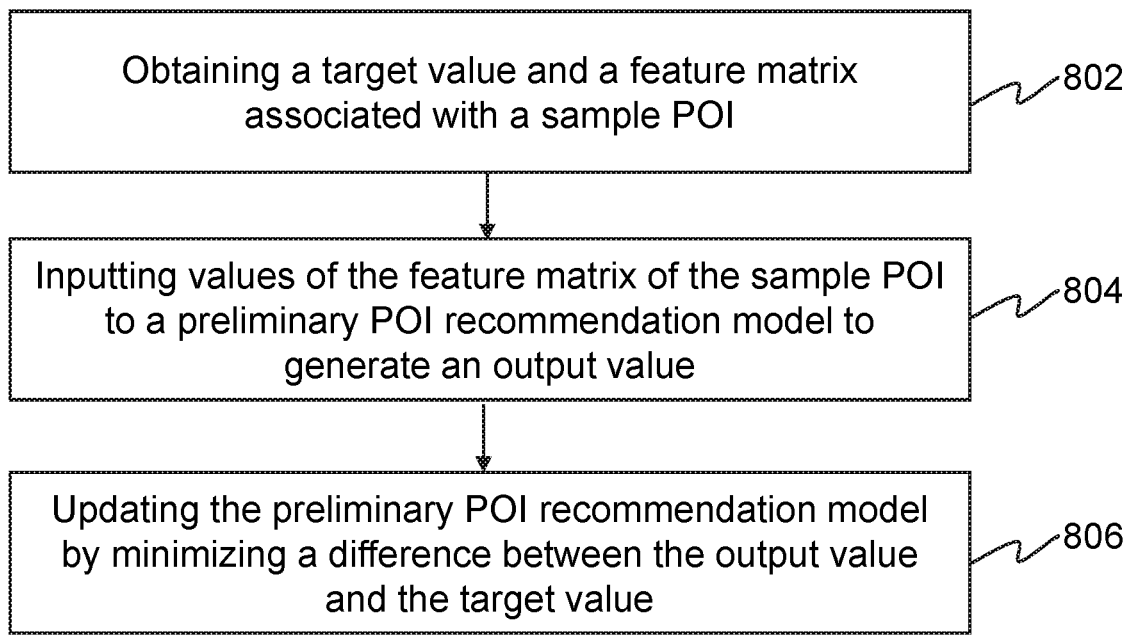
FIG. 8 is a flowchart illustrating an exemplary process for training a preliminary POI recommendation model according to some embodiments of the present disclosure.

FIG. 8 is a flowchart illustrating an exemplary process for training a preliminary POI recommendation model according to some embodiments of the present disclosure. The process 800 may be executed by the online-to-offline service system 100. For example, the process 800 may be implemented as a set of instructions (e.g., an application) stored in the storage 150, the ROM 230 or the RAM 240. The server 110, the processing engine 112, the processor 220 and/or modules in the FIG. 4 may execute the set of instructions, and when executing the instructions, the server 110, the processing engine 112, the processor 220 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting. In some embodiments, process 800 may correspond to the operation 508 of process 500.

In 802, the processing engine 112 (e.g., the model training module 440) may obtain a target value and a feature matrix associated with a sample POI. The target value may be determined based on a label of the sample POI. In some embodiments, a positive sample POI may include a target value of "1" (or any other value), while a negative sample POI may include a target value of "0" (or any other value different from the target value of the positive sample POI). In some embodiments, the processing engine 112 may obtain the sample POI from the POI determination module 430 or the storage 150 via the network 120.

In 804, the processing engine 112 (e.g., the model training module 440) may input values of the feature matrix of the sample POI to a preliminary POI recommendation model to generate an output value. In some embodiments, the preliminary POI recommendation model may be stored in a storage device as an application or a part thereof. The preliminary POI recommendation model may include a plurality of classifiers. Each of the plurality of classifiers may correspond to a particular feature in the feature matrix of the sample POI. Each classifier may output a score indicating a probability that the sample POI being the pick-up location of a service request regarding the corresponding feature. Each classifier may correspond to a weight associated with the POI recommendation model. The weight of a classifier may indicate how tight the corresponding feature of the classifier is related to the output (e.g., a recommended pick-up location) of the preliminary POI recommendation model. For example, a feature that is shared by both positive samples and negative samples may correspond to a relatively low weight while a feature that only the positive samples have may correspond to a relatively high weight. The output of the POI recommendation model may be determined based on outputs of the plurality of classifiers and the plurality of weights. The output of the POI recommendation model may indicate a probability that an inputted sample POI being a recommended pick-up location of a service request.

In 806, the processing engine 112 (e.g., the model training module 440) may update the preliminary POI recommendation model by minimizing a difference between the output value and the target value. The processing engine 112 may minimize the difference between the output value and the target value based on a gradient descent method. The gradient descent method may be a fast gradient method, a momentum method, etc. In some embodiments, the processing engine 112 may determine one or more parameters related to the gradient descent method. For example, the processing engine 112 may determine a gradient vector for the loss function. As another example, the processing engine 112 may determine a step size for the gradient descent method. In some embodiments, the processing engine 112 may determine a convergence condition. The convergence condition may be used to determine whether the updating of the preliminary POI recommendation model is completed or whether the preliminary POI recommendation model is trained. For example, the processing engine 112 may keep updating the preliminary POI recommendation model (or the updated preliminary POI recommendation model) and determining the difference between the output value and the target value until the convergence condition is met. The convergence condition may be determined based on a user input, or a default setting. In some embodiments, the updated or trained POI recommendation model may be used to recommend one or more pick-up locations related to an online-to-offline service application or a navigation service application. For example, a service requester may initiate a service request in an online-to-offline service application without inputting any pick-up location, and the online-to-offline service application may auto-fill a recommended pick-up location for the user based on a current location of him or her.

Figure 9:
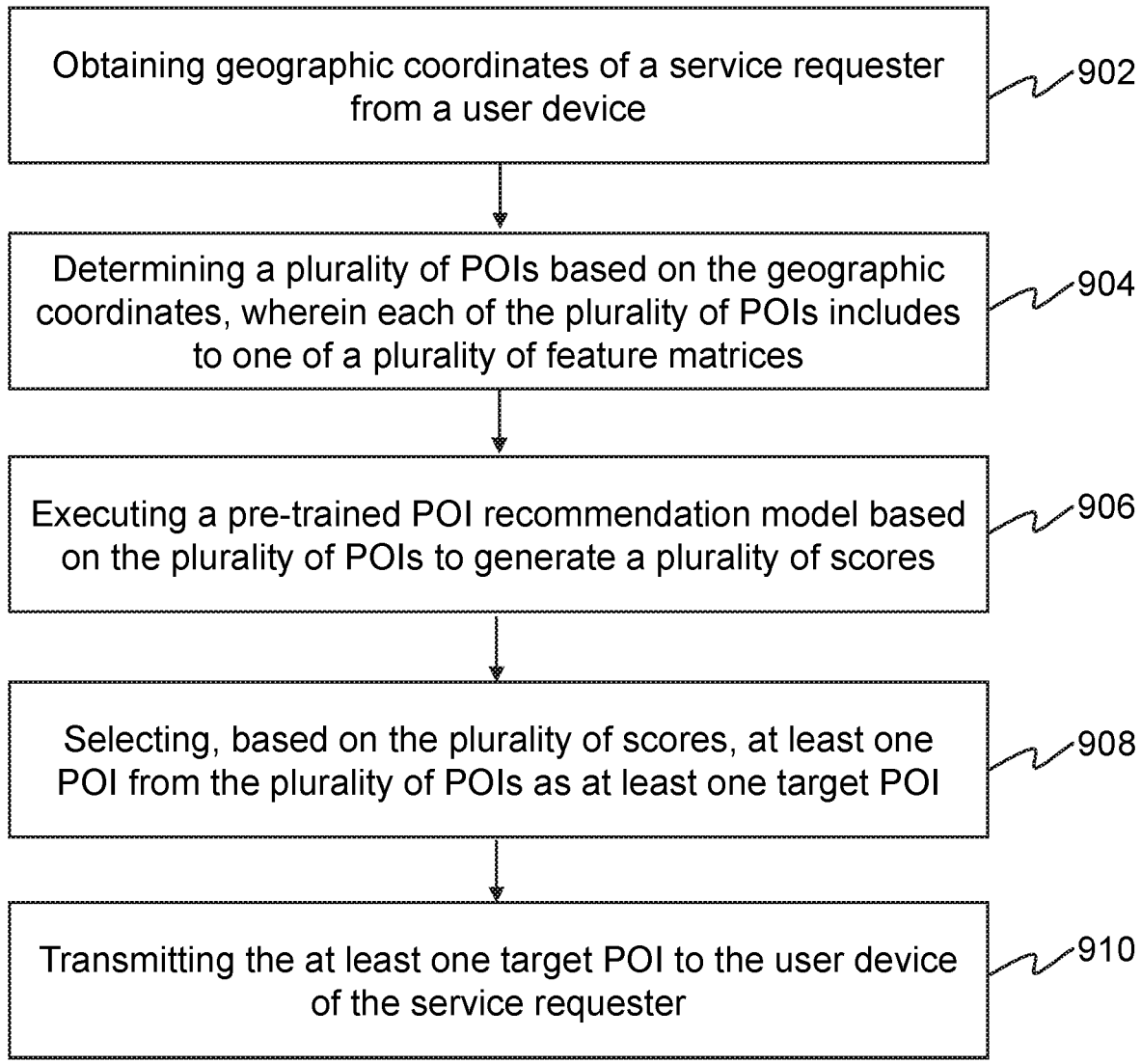
FIG. 9 is a flowchart illustrating an exemplary process for determining a pick-up location for a service request according to some embodiments of the present disclosure.

FIG. 9 is a flowchart illustrating an exemplary process for determining a pick-up location for a service request according to some embodiments of the present disclosure. The process 900 may be executed by the online-to-offline service system 100. For example, the process 900 may be implemented as a set of instructions (e.g., an application) stored in the storage 150, the ROM 230 or the RAM 240. The server 110, the processing engine 112, the processor 220 and/or modules in the FIG. 4 may execute the set of instructions, and when executing the instructions, the server 110, the processing engine 112, the processor 220 and/or the modules may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 902, the processing engine 112 (e.g., the data acquisition module 410) may obtain geographic coordinates of a service requester from a user device (e.g., the requester terminal 130). The geographic coordinates of the service requester may be associated with a service request that may be sent by a passenger for a car hailing service. The geographic coordinates of the service requester may indicate the current location of the service requester when the service requester initiates the service request. In some embodiments, the current location of the service requester or the current location of the user device associated with the service requester (e.g., a requester terminal 130) may be determined by a GPS unit of the user device (e.g., a GPS chipset).

In 904, the processing engine 112 (e.g., the location determination module 450) may determine a plurality of POIs based on (or around) the geographic coordinates of the service requester, wherein each of the plurality of POIs is associated with a feature matrix. For example, the processing engine 112 may determine the locations of the plurality of POIs using a locals service. The determination of the plurality of feature matrices may be found elsewhere in the present disclosure (e.g., FIG. 6 and the process 600).

In 906, the processing engine 112 (e.g., the location determination module 450) may execute a pre-trained POI recommendation model based on the plurality of POIs to generate a plurality of scores. For example, the processing engine 112 may use one of the plurality of POIs as the input of the pre-trained POI recommendation model, and the pre-trained POI recommendation model may generate a score of the appropriateness of the POI being a recommended pick-up location as an output. In this way, the processing engine 112 may determine the plurality of scores corresponding to the plurality of POIs.

The pre-trained POI recommendation model may be obtained from the model training module 440. In some embodiments, the pre-trained POI recommendation model may be trained based on a plurality of historical service requests. The pre-trained POI recommendation model may be generated according to the exemplary process for training a preliminary POI recommendation model disclosed elsewhere in the present disclosure (e.g., FIG. 8 and the process 800). In some embodiments, the processor that trains the preliminary POI recommendation model may be different from the processor that executes the pre-trained POI recommendation model. For example, the preliminary POI recommendation model may first be trained by a remote processor outside the online-to-offline service system 100 and stored in the storage 150. The processing engine 112 may then access the storage 150 to execute the pre-trained POI recommendation model.

In 908, the processing engine 112 (e.g., the location determination module 450) may select, based on the plurality of scores, at least one POI from the plurality of POIs as at least one target POI. The at least one target POI may be candidate pick-up locations (e.g., pick-up locations 1040-1070 in FIG. 10) determined by the online-to-offline service system 100. The processing engine 112 may select, from the plurality of POIs, at least one POI with highest scores or with scores higher than a threshold as the at least one target POI. The score corresponding to a POI may indicate a probability of the POI becoming a recommended pick-up location which is generally close to the current location, convenient, visible, and accurate. For example, POIs with scores higher than 80 may be determined as the at least one target POI. The processing engine 112 may store the one or more POIs in descending order according to the scores of the POIs in a storage device (e.g., the storage 150) disclosed elsewhere in the present disclosure.

In some embodiments, the processing engine 112 may delete at least one POI from the plurality of POIs based on passenger information of the service requester and/or driver information of the service provider before determining the at least one target POI. The passenger information may include user age, user gender, user occupation, user preference, or the like, or any combination thereof. The driver information may include driving habit, driving preference, a current driving route, or the like, or any combination thereof. For example, the processing engine 112 may delete POIs on a mountain or an uphill when the service requester is an elderly. As another example, the processing engine 112 may delete POIs on a wrong side of the road associated with the current driving route of the service provider.

Figure 12:
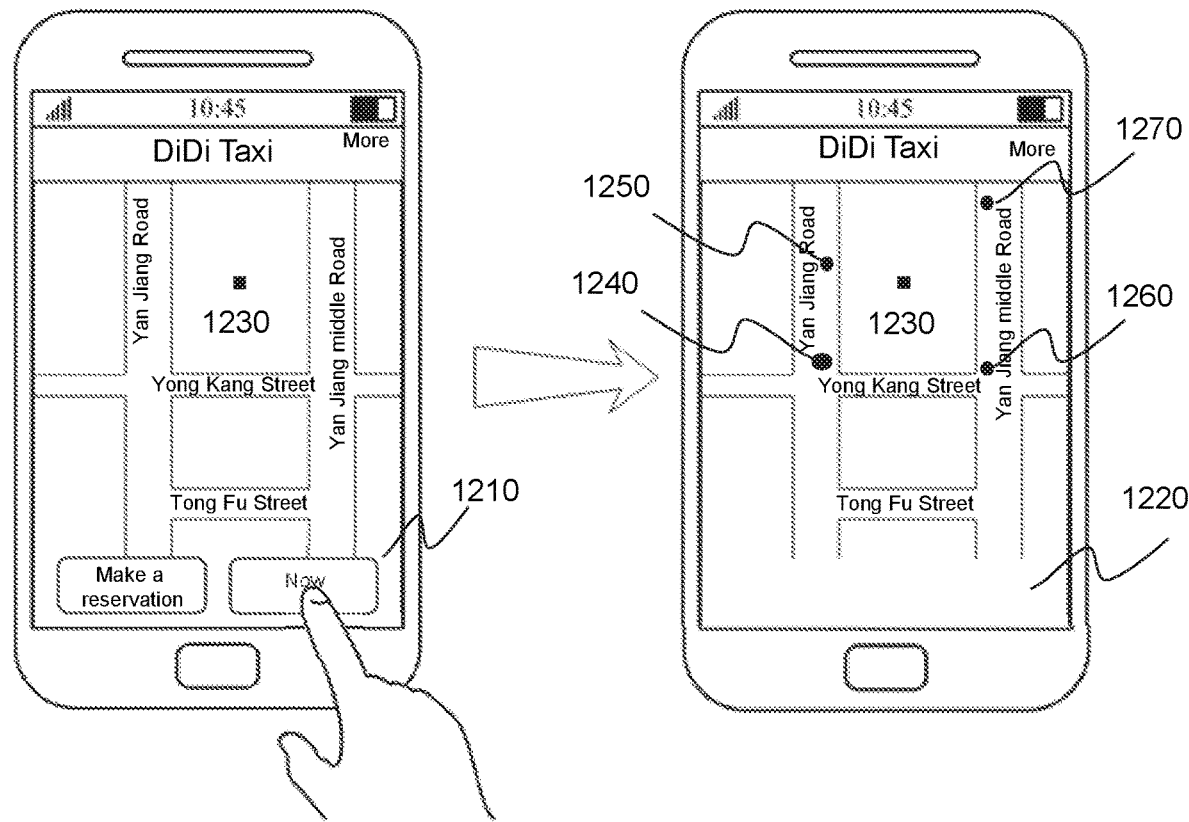
FIG. 12 is a schematic diagram illustrating exemplary interfaces for displaying at least one target POI according to some embodiments of the present disclosure.

In 910, the processing engine 112 (e.g., the location determination module 450) may transmit the at least one target POI to the user device of the service requester. In some embodiments, the processing engine 112 may transmit the at least one target POI to the provider terminal 140, a requester terminal 130, and/or any component of the online-to-offline service system 100 (e.g., the storage 150). The terminal(s) may display the one or more determined destinations on a display of the terminal (s) via a graphic user interface (GUI). The number of target POIs displayed on the display may be adjusted based on a preference of the service requester. In some embodiments, the at least one target POI may be displayed on a digital map as illustrated in FIG. 12 (e.g., interface 1020). Different target POIs may be displayed in same or different shapes or colors in the map. For example, a target POI determined as the most strongly recommended pick-up location may be displayed as a triangle while other target POIs may be displayed as rectangles. The service requester may click on the display to select one of the at least one target POI as his/her pick-up location. In response to a determination that the service requester does not choose any of the at least one target POI as the pick-up location, the terminal(s) may display an input box for the service requester to manually input the pick-up location. As another example, in response to a determination that the service requester does not choose any of the at least one target POI as the pick-up location, the terminal(s) may display a map including a current location of the service requester. The service requester may manually select a location on the map as the pick-up location. The current location of the service requester may be determined by a GPS unit (e.g., GPS microchip or chipset) in the service requester terminal(s).

Figure 10:
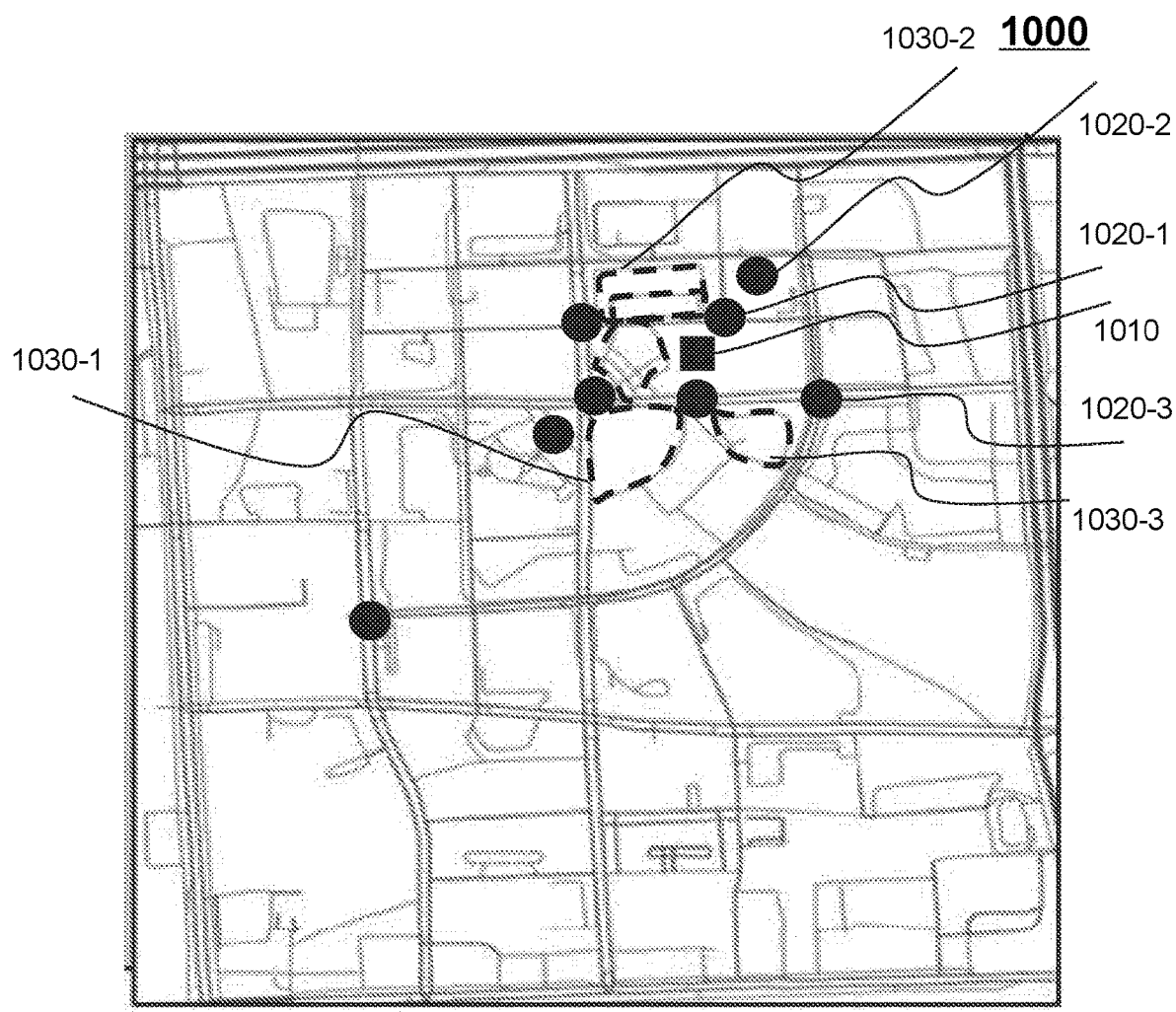
FIG. 10 is a schematic diagram illustrating an exemplary digital map displaying a current location, a plurality of candidate POIs around the current location, and area information related to the current location according to some embodiments of the present disclosure.

FIG. 10 is a schematic diagram illustrating an exemplary digital map displaying a current location, a plurality of candidate POIs around the current location, and area information related to the current location according to some embodiments of the present disclosure. As shown in FIG. 10, POI 1010 (as shown in a rectangle symbol) may represent a current location of a service requester who initiates a service request. The current location of the service requester may be the current location of a user device associated with the service requester (e.g., a requester terminal 130) determined by a GPS unit of the user device (e.g., a GPS chipset). A plurality of POIs 1020-1, 1020-2, and 1020-3 (as shown in circle symbols) may represent a plurality of candidate POIs around the current location. Areas 1020-1, 1020-2, and 1020-3, each bounded by dash lines, may represent one or more AOIs related to the current location. It should be noted that the digital map in FIG. 10 is provided merely for illustration purposes.

Figure 11:
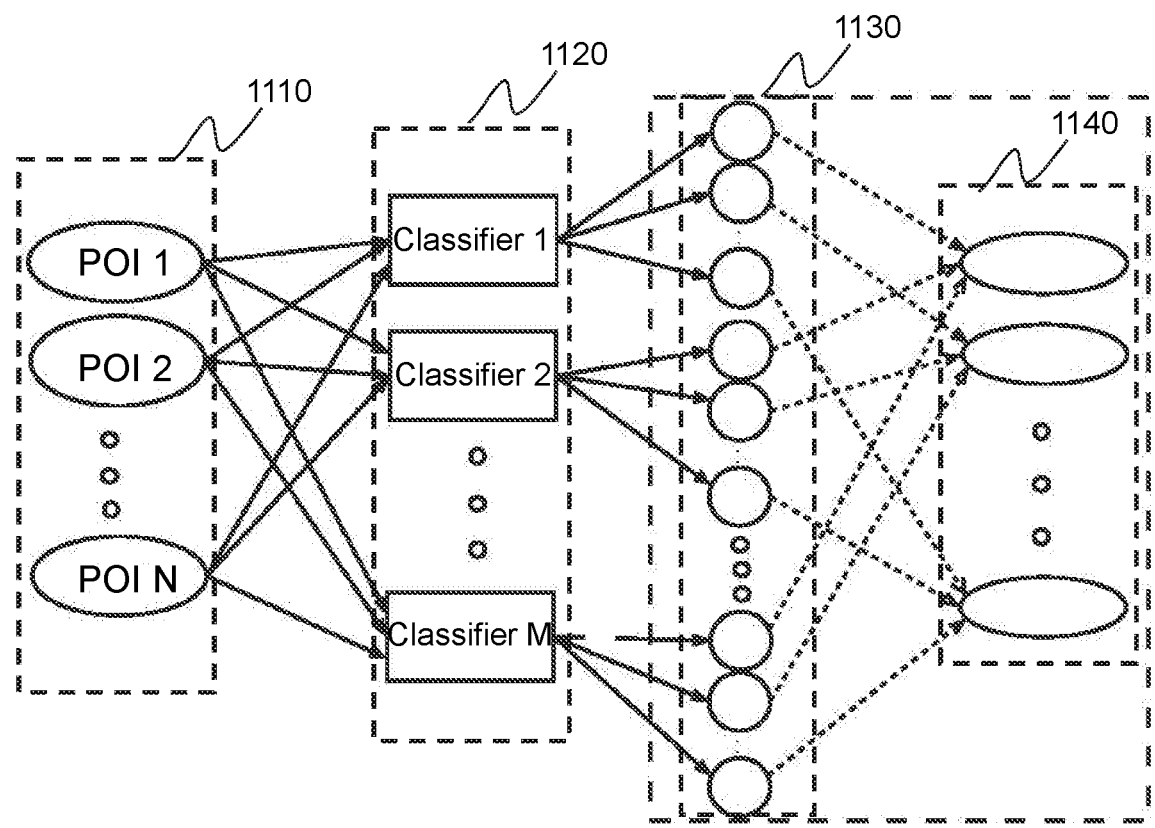
FIG. 11 is a schematic diagram illustrating the structure of an exemplary recommendation model according to some embodiments of the present disclosure.

FIG. 11 is a schematic diagram illustrating the structure of an exemplary POI recommendation model according to some embodiments of the present disclosure. As described elsewhere in the present disclosure, the POI recommendation model 1100 may be implemented by a device (e.g., the processing engine 112) of the online-to-offline service system 100 to determine one or more POI recommended pick-up locations.

As illustrated in FIG. 11, inputs of the POI recommendation model 1100 may include a set of sample POIs 1110. The set of sample POIs 1110 may include a plurality of feature matrices (e.g., each of the plurality of feature matrices may correspond to a sample POI). Optionally, the inputs of the POI recommendation model 1110 may further include the label(s) of the set of sample POIs.

Each of the set of sample POIs 1110 may be inputted into a plurality of classifiers 1120, wherein each of the plurality of classifiers 1120 corresponds to a feature of the feature matrix. For example, a first classifier may correspond to whether the sample POI and the current location of the service requester are on the same side of a road. As another example, a second classifier may correspond to whether the distance between the sample POI and the current location of the service requester is greater than 150 meters.

The plurality of classifiers 1120 may output a plurality of classifier scores 1130, wherein each of the plurality of classifiers 1120 may output one of the plurality of classifier scores for each of the set of sample POIs. The higher a classifier score for a sample POI, the more likely the sample POI being a pick-up location with respect to the feature corresponding to the classifier. In some embodiments, each of the plurality of classifiers 1120 may include a weight. The weight may indicate the importance of the corresponding classifier among the plurality of classifiers with respect to the POI recommendation model.

A plurality of output values 1140 may be generated based on the plurality of classifier scores 1130, wherein each of the plurality of output values 1140 may correspond to an inputted sample POI. For example, the processing engine 112 may determine an output value for the $i^{th}$ sample POI as:

$$y = \Sigma_{j=1}^{j=M} S_i^j w_j \qquad (1)$$

where y denotes the output value for the ith sample POI, $S_i^j$ denotes a classifier score of the $j^{th}$ classifier for the $i^{th}$ sample POI, and $w_j$ denotes the weight of the $j^{th}$ classifier.

FIG. 12 is a schematic diagram illustrating exemplary interfaces for displaying at least one target POI according to some embodiments of the present disclosure. The interfaces 1210-1220 in FIG. 12 are exemplary interfaces associated with an online car-hailing service. For example, the online car-hailing service may be provided by a car-hailing service App such as "DiDi Taxi".

When the requester aims for requesting a service request via a user device (e.g., a requester terminal 130), the user device may obtain a current location of the requester terminal using a positioning technology, such as the GPS and display a map around the current location 1230 of the requester terminal on the display of the user device as shown in interface 1210. The names of a plurality of streets may be shown on the interface 1210, such as "Tong Fu Street", "Yong Kang Street", etc. The DiDi Taxi App may provide two options for the requester, e.g., to make a service request now, or to reserve for a future service request. For example, the requester may tap on the icon with the text "Now" to initiate a service request.

After clicking "Now" in the interface 1210, interface 1220 may be displayed on the display of the requester terminal. Three candidate pick-up locations 1250-1270 (as shown in circle symbols) and one most strongly recommended pick-up location 1240 (as shown in a circle symbol) are displayed in the interface 1220. In some embodiments, the size of a circle associated with a recommended pick-up location may indicate a recommending degree (e.g., the scores as disclosed elsewhere in the present application). The bigger the circle is, the more strongly the candidate pick-up location is recommended. The requester may confirm the most strongly recommended pick-up location 1240 or select a candidate pick-up location, for example, by tapping on the symbol of the most strongly recommended pick-up location 1240 or the symbol of the selected candidate pick-up location. If the candidate pick-up locations and the most strongly recommended pick-up location are inaccurate, the service requester may manually select a location on the map as the pick-up location, or manually input a location.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "some embodiments," and/or "some embodiments" mean that a particular feature, structure or characteristic described in connection with some embodiments is included in at least one embodiment of the present disclosure. Therefore, it is emphasized and should be appreciated that two or more references to "some embodiments," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for generating a POI (points of interest) recommendation model using intelligent data mining, comprising:
 at least one non-transitory computer-readable storage medium including a set of instructions; and
 at least one processor in communication with the at least one non-transitory computer-readable storage medium, wherein when executing the set of instructions, the at least one processor is directed to:
  obtain prestored data related to a plurality of historical service requests from a storage device;
  for each of the plurality of historical service requests, obtain geographic coordinates of a historical service requester when the historical service request is initiated;

determine one or more addresses corresponding to the geographic coordinates of the historical service requester;

determine a plurality of candidate points of interest (POIs) around the historical service requester based on the one or more addresses; and generate a plurality of feature matrices, each of the plurality of feature matrices associated with each of the plurality of candidate POIs, based on area information related to the geographic coordinates of the historical service requester, the feature matrix indicating one or more spatial features of each of the plurality of candidate POIs;

generate a set of sample POIs from the plurality of candidate POIs based on the plurality of feature matrices, including:
  labeling each of the plurality of candidate POIs based at least on a historical pick-up location related to the corresponding historical service request including:
    labeling a candidate POI as a positive candidate POI if the candidate POI matches with the historical pick-up location;
    labeling a candidate POI as a negative candidate POI if the candidate POI does not match with the historical pick-up location; and
    generating a set of positive sample POIs and a set of negative sample POIs based on the labeling;

determine an optimization score for each of the set of positive sample POIs;

relabel a positive sample POI as a negative sample POI in response to a determination that the optimization score of the positive sample POI is greater than a threshold;

iteratively train a preliminary POI recommendation model using the set of sample POIs with associated feature matrices until the preliminary POI recommendation model converges; and store the trained preliminary POI recommendation model in the at least one non-transitory computer-readable storage medium.

2. The system of claim 1, wherein
the area information includes one or more areas of interest (AOIs) related to the geographic coordinates of the historical service requester determined based on the one or more addresses, and
to generate a plurality of feature matrices, each of the plurality of feature matrices associated with each of the plurality of candidate POIs, based on area information related to the geographic coordinates, the at least one processor is further directed to:
  extract one or more spatial relationships between each of the plurality of candidate POIs and the one or more AOIs; and
  generate the feature matrix associated with each of the plurality of candidate POIs based on the one or more spatial relationships.

3. The system of claim 1, wherein
the area information includes one or more roads related to the one or more addresses, and
to generate a plurality of feature matrices, each of the plurality of feature matrices associated with each of the plurality of candidate POIs, based on area information related to the geographic coordinates, the at least one processor is further directed to:
  extract one or more spatial relationships between each of the plurality of candidate POIs and the one or more roads; and
  generate the feature matrix associated with each of the plurality of candidate POIs based on the one or more spatial relationships.

4. The system of claim 1, wherein
the preliminary POI recommendation model includes one or more classifiers, each of the one or more classifiers corresponding to one of the one or more spatial features of each of the plurality of candidate POIs and having a preliminary parameter, and
to iteratively train a preliminary POI recommendation model using the set of sample POIs with associated feature matrices until the preliminary POI recommendation model converges, the at least one processor is further directed to:
  update the preliminary parameters of the one or more classifiers during the iterative training of the preliminary POI recommendation model.

5. The system of claim 4, wherein to update the preliminary parameters of the one or more classifiers during the iterative training of the preliminary POI recommendation model, the at least one processor is further directed to in each iteration,
  input a sample POI to the preliminary POI recommendation model;
  determine values of the feature matrix associated with the sample POI, each value indicating whether the sample POI is related to the corresponding spatial feature;
  execute the POI recommendation model to generate an output value in response to the inputted sample POI based on the values of the feature matrix and the one or more preliminary parameters associated with the one or more classifiers;
  obtain a target value based on the label of the sample POI; and
  update the one or more preliminary parameters associated with the one or more classifiers by minimizing a difference between the output value and the target value.

6. The system of claim 1, wherein to determine an optimization score for each of the set of positive sample POIs, the at least one processor is further directed to:
  obtain a first time point from a positive sample POI, the first time point corresponding to an arrival time of a historical service provider at the positive sample POI;
  obtain a second time point from the positive sample POI, the second time point corresponding to a pick-up time of the corresponding historical service request by the historical service provider;
  obtain a time difference between the first time point and the second time point; and determine the optimization score of the positive sample POI based on the time difference.

7. The system of claim 1, wherein to determine an optimization score for each of the set of positive sample POIs, the at least one processor is further directed to:
  determine a plurality of AOs related to the geographic coordinates of the historical service requester based on the one or more addresses; and
  determine the optimization score for each of the set of positive sample POIs based on a spatial relationship between the each of the set of positive sample POIs and the plurality of AOIs.

8. The system of claim 1, wherein
the set of positive sample POIs is divided into a training set of positive sample POIs and a testing set of positive sample POIs,
the set of negative sample POIs is divided into a training set of negative sample POIs and a testing set of negative sample POIs, and
to train the preliminary POI recommendation model, the at least one processor is directed to:
train the preliminary POI recommendation model based on the training set of positive sample POIs and the training set of negative sample POIs to generate the trained POI recommendation model, and
evaluate the trained POI recommendation model based on the testing set of positive sample POIs and the testing set of negative sample POIs.

9. A method implemented on a computing device having at least one processor, at least one non-transitory storage medium and a communication platform connected to a network, the method comprising:
obtaining prestored data related to a plurality of historical service requests from a storage device;
for each of the plurality of historical service requests, obtaining geographic coordinates of a historical service requester when the historical service request is initiated;
determining one or more addresses corresponding to the geographic coordinates of the historical service requester;
determining a plurality of candidate points of interest (POIs) around the historical service requester based on the one or more addresses; and
generating a plurality of feature matrices, each of the plurality of feature matrices associated with each of the plurality of candidate POIs, based on area information related to the geographic coordinates of the historical service requester, the feature matrix indicating one or more spatial features of each of the plurality of candidate POs;
generating a set of sample POIs from the plurality of candidate POIs based on the plurality of feature matrices, including:
labeling each of the plurality of candidate POIs based at least on a historical pick-up location related to the corresponding historical service request including:
labeling a candidate POI as a positive candidate POI if the candidate POI matches with the historical pick-up location;
labeling a candidate POI as a negative candidate POI if the candidate POI does not match with the historical pick-up location; and
generating a set of positive sample POIs and a set of negative sample POs based on the labeling;
determine an optimization score for each of the set of positive sample POIs;
relabel a positive sample POI as a negative sample POI in response to a determination that the optimization score of the positive sample POI is greater than a threshold;
iteratively training a preliminary POI recommendation model using the set of sample POIs with associated feature matrices until the preliminary POI recommendation model converges; and
storing the trained preliminary POI recommendation model in the at least one non-transitory storage medium.

10. The method of claim 9, wherein
the area information includes one or more areas of interest (AOIs) related to the geographic coordinates of the historical service requester determined based on the one or more addresses, and
the generating a plurality of feature matrices, each of the plurality of feature matrices associated with each of the plurality of candidate POIs, based on area information related to the geographic coordinates includes:
extracting one or more spatial relationships between each of the plurality of candidate POIs and the one or more AOIs; and
generating the feature matrix associated with each of the plurality of candidate POIs based on the one or more spatial relationships.

11. The method of claim 9, wherein
the area information includes one or more roads related to the one or more addresses, and
the generating a plurality of feature matrices, each of the plurality of feature matrices associated with each of the plurality of candidate POIs, based on area information related to the geographic coordinates includes:
extracting one or more spatial relationships between each of the plurality of candidate POIs and the one or more roads; and
generating the feature matrix associated with each of the plurality of candidate POIs based on the one or more spatial relationships.

12. The method of claim 9, wherein
the preliminary POI recommendation model includes one or more classifiers, each of the one or more classifiers corresponding to one of the one or more spatial features of each of the plurality of candidate POIs and having a preliminary parameter, and
the iteratively training a preliminary POI recommendation model using the set of sample POIs with associated feature matrices until the preliminary POI recommendation model converges includes:
updating the preliminary parameters of the one or more classifiers during the iterative training of the preliminary POI recommendation model.

13. The method of claim 12, wherein the updating the preliminary parameters of the one or more classifiers during the iterative training of the preliminary POI recommendation model includes:
in each iteration,
inputting a sample POI to the preliminary POI recommendation model;
determining values of the feature matrix associated with the sample POI, each value indicating whether the sample POI is related to the corresponding spatial feature;
executing the POI recommendation model to generate an output value in response to the inputted sample POI based on the values of the feature matrix and the one or more preliminary parameters associated with the one or more classifiers;
obtaining a target value based on the label of the sample POI; and
updating the one or more preliminary parameters associated with the one or more classifiers by minimizing a difference between the output value and the target value.

14. The method of claim 9, wherein the determining an optimization score for each of the set of positive sample POIs includes:

obtaining a first time point from a positive sample POI, the first time point corresponding to an arrival time of a historical service provider at the positive sample POI;

obtaining a second time point from the positive sample POI, the second time point corresponding to a pick-up time of the corresponding historical service request by the historical service provider;

obtaining a time difference between the first time point and the second time point; and determining the optimization score of the positive sample POI based on the time difference.

15. The method of claim 9, wherein the determining an optimization score for each of the set of positive sample POIs includes:

determining a plurality of AOs related to the geographic coordinates of the historical service requester based on the one or more addresses; and determining the optimization score for each of the set of positive sample POIs based on a spatial relationship between the each of the set of positive sample POIs and the plurality of AOIs.

* * * * *